United States Patent
Qin et al.

(10) Patent No.: US 12,415,298 B2
(45) Date of Patent: Sep. 16, 2025

(54) COMPONENT INCLUDING A VOLATILE HYDROPHOBIC COATING AND METHODS INCLUDING THE SAME

(71) Applicant: KIMBERLY-CLARK WORLDWIDE, INC., Neenah, WI (US)

(72) Inventors: Jian Qin, Appleton, WI (US); Sridhar Ranganathan, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 17/928,299

(22) PCT Filed: Dec. 23, 2020

(86) PCT No.: PCT/US2020/066778
§ 371 (c)(1),
(2) Date: Nov. 29, 2022

(87) PCT Pub. No.: WO2021/242320
PCT Pub. Date: Dec. 2, 2021

(65) Prior Publication Data
US 2023/0311095 A1    Oct. 5, 2023

Related U.S. Application Data

(60) Provisional application No. 63/031,791, filed on May 29, 2020.

(51) Int. Cl.
*B29B 7/60*     (2006.01)
*B01F 23/50*    (2022.01)
(Continued)

(52) U.S. Cl.
CPC .............. *B29B 7/60* (2013.01); *B01F 23/511* (2022.01); *B01F 23/56* (2022.01); *B01F 23/582* (2022.01);
(Continued)

(58) Field of Classification Search
None
See application file for complete search history.

(56) References Cited

U.S. PATENT DOCUMENTS 4,734,478 A    3/1988   Tsubakimoto et al.
5,716,707 A *  2/1998   Mukaida ................. A61L 15/60
                                                    428/407
(Continued)

FOREIGN PATENT DOCUMENTS

CN    1252822 A    5/2000
CN    101511917 A  8/2009
(Continued)

OTHER PUBLICATIONS

Motasadizadeh, H.R. et al., "Hydrophobic Surface Treatment of Acrylic Superabsorbent", Oct. 6, 2014, Iran Polymer and Perochemical, https://www.sid.ir/FileServer/SE/287E20141166.pdf.
(Continued)

*Primary Examiner* — Benjamin A Schiffman
(74) *Attorney, Agent, or Firm* — KIMBERLY-CLARK WORLDWIDE, INC.

(57) ABSTRACT

Methods of manufacturing a substrate including a component, such as superabsorbent material, having a volatile hydrophobic coating are disclosed. The method can include providing a fluid supply including a liquid and providing a supply of the component. The component can include a volatile hydrophobic coating. The method can include introducing the component to the fluid supply. The method can also include transferring the component in the fluid supply to provide the substrate. The method can further include applying heat to the substrate. The heat can remove the volatile hydrophobic coating from the component.

14 Claims, 7 Drawing Sheets

(51) Int. Cl.

| | | |
|---|---|---|
| *B01F 25/312* | (2022.01) | |
| *B01F 35/221* | (2022.01) | |
| *B01F 35/71* | (2022.01) | |
| *B01J 20/24* | (2006.01) | |
| *B01J 20/26* | (2006.01) | |
| *B01J 20/28* | (2006.01) | |
| *B01J 20/32* | (2006.01) | |
| *D04H 1/407* | (2012.01) | |
| *D04H 1/425* | (2012.01) | |
| *D04H 1/732* | (2012.01) | |
| *B01F 27/91* | (2022.01) | |
| *B01F 33/81* | (2022.01) | |
| *B01F 33/82* | (2022.01) | |
| *B29B 7/74* | (2006.01) | |

(52) U.S. Cl.
CPC ........ *B01F 23/59* (2022.01); *B01F 25/31243* (2022.01); *B01F 35/2211* (2022.01); *B01F 35/71* (2022.01); *B01J 20/24* (2013.01); *B01J 20/26* (2013.01); *B01J 20/28023* (2013.01); *B01J 20/28026* (2013.01); *B01J 20/2803* (2013.01); *B01J 20/3208* (2013.01); *B01J 20/3223* (2013.01); *B01J 20/3287* (2013.01); *B01J 20/3293* (2013.01); *D04H 1/407* (2013.01); *D04H 1/425* (2013.01); *D04H 1/732* (2013.01); *B01F 27/91* (2022.01); *B01F 33/813* (2022.01); *B01F 33/8212* (2022.01); *B29B 7/7409* (2013.01); *B29B 7/7461* (2013.01)

(56) References Cited

U.S. PATENT DOCUMENTS

| | | | |
|---|---|---|---|
| 6,090,875 A | 7/2000 | Staples et al. | |
| 6,376,011 B1 | 4/2002 | Reeves et al. | |
| 6,395,830 B1 * | 5/2002 | Jonas | C08L 51/08 |
| | | | 525/329.9 |
| 6,706,944 B2 | 3/2004 | Qin et al. | |
| 6,862,205 B2 * | 3/2005 | Agata | G11C 11/4085 |
| | | | 365/207 |
| 7,335,809 B2 | 2/2008 | Riesinger | |
| 7,429,689 B2 | 9/2008 | Chen et al. | |
| 7,994,384 B2 | 8/2011 | Qin et al. | |
| 8,252,715 B2 * | 8/2012 | Torii | C08L 101/14 |
| | | | 502/402 |
| 8,501,873 B2 * | 8/2013 | Sasabe | C08J 3/248 |
| | | | 525/383 |
| 8,598,052 B2 | 12/2013 | Suzuki et al. | |
| 10,238,554 B2 | 3/2019 | Umemoto | |
| 10,857,256 B2 * | 12/2020 | Mark | C08F 265/04 |
| 11,066,496 B2 * | 7/2021 | Sohn | C08J 3/245 |
| 11,344,455 B2 * | 5/2022 | Tagomori | A61F 5/44 |
| 11,859,059 B2 * | 1/2024 | Bauer | C08J 3/126 |
| 2004/0115419 A1 | 6/2004 | Qin et al. | |
| 2008/0045916 A1 * | 2/2008 | Herfert | A61L 15/60 |
| | | | 604/372 |
| 2009/0012486 A1 | 1/2009 | Riegel et al. | |
| 2010/0010461 A1 * | 1/2010 | Herfert | C08J 3/12 |
| | | | 428/407 |
| 2018/0353353 A1 | 12/2018 | Konawa | |
| 2019/0099303 A1 | 4/2019 | Viens et al. | |
| 2020/0001578 A1 | 1/2020 | Behafarid et al. | |
| 2020/0093188 A1 * | 3/2020 | Tanaka | A61F 13/8405 |
| 2023/0241561 A1 * | 8/2023 | Marrano | B01J 20/3208 |
| | | | 366/163.2 |

FOREIGN PATENT DOCUMENTS

| | | |
|---|---|---|
| CN | 107438632 A | 12/2017 |
| CN | 110628051 A | 12/2019 |
| EP | 0850629 B1 | 9/2004 |
| EP | 1833521 B1 | 8/2009 |
| EP | 2127741 B1 | 5/2019 |
| EP | 3549567 A1 | 10/2019 |
| EP | 1411874 B2 | 11/2019 |
| EP | 3636090 A1 | 4/2020 |
| EP | 3467009 B1 | 5/2021 |
| JP | H02242858 A | 9/1990 |
| JP | H06248187 A | 9/1994 |
| JP | 2010185029 A | 8/2010 |
| JP | 2011207997 A | 10/2011 |
| JP | 2011252088 A | 12/2011 |
| WO | 2006025586 A1 | 3/2006 |
| WO | 2006106108 A1 | 10/2006 |
| WO | 2010113919 A1 | 10/2010 |
| WO | 2018062388 A1 | 4/2018 |
| WO | 2018180600 A1 | 10/2018 |
| WO | 2019154652 A1 | 8/2019 |

OTHER PUBLICATIONS

Anonymous, "Third Party Observation", Sep. 19, 2022.

\* cited by examiner

COMPONENT INCLUDING A VOLATILE HYDROPHOBIC COATING AND METHODS INCLUDING THE SAME

TECHNICAL FIELD

The present disclosure relates to components including coatings and apparatuses and methods for handling such components and forming substrates including such components. More specifically, the present disclosure relates to components including a volatile hydrophobic coating and methods including the same.

BACKGROUND OF THE DISCLOSURE

Personal care products, such as diapers, diaper pants, training pants, adult incontinence products, and feminine care products, can include a variety of substrates. For example, a diaper can include an absorbent structure, nonwoven materials, and films. Similarly, facial tissues, wipes, and wipers can also include various substrates. Some of the substrates in these products can include natural and/or synthetic fibers. In some products, some substrates can also include different types of components to provide additional functionality to the substrate and/or the end product itself.

For example, one such component that may be desirable to add to a substrate includes a superabsorbent material (SAM). SAM can be configured in the form of a particle or a fiber and is commonly utilized in substrates for increased absorbent capacity. Absorbent systems of personal care absorbent products, such as a diaper, often include SAM. Processes exist for forming a substrate with SAM, including utilizing forming chambers to mix SAM particles or fibers with cellulosic fibers to form an absorbent core. These processes are generally completed in a dry environment, as SAM can be difficult to process when wet due to increase in volume from absorption of fluid and gelling, among other potential drawbacks. However, alternative substrate forming processes can employ fluids, such as liquids, to create substrates providing various other characteristics and efficiencies in manufacturing and performance of such substrates.

Thus, there exists a need to develop methods and apparatuses for introducing a component into a fluid supply for forming substrates in which the component is protected from the fluid supply, and methods and apparatuses for forming substrates including such components. There also exists a need to develop absorbent materials including SAM with a protective coating that can provide shielding in a wet environment, but can be removed when no longer needed.

SUMMARY OF THE DISCLOSURE

In one embodiment, a method of manufacturing a substrate including a component is provided. The method can include providing a fluid supply including a liquid. The method can also include providing a supply of the component. The component can include a volatile hydrophobic coating. The method can further include introducing the component to the fluid supply. The method can further include transferring the component in the fluid supply to provide the substrate. Additionally, the method can include applying heat to the substrate. The heat can remove the volatile hydrophobic coating from the component.

In another embodiment, a method for handling a superabsorbent material is provided. The method can include providing a fluid supply including a liquid. The method can further include providing a supply of the superabsorbent material. The superabsorbent material can include a volatile hydrophobic coating. The method can include introducing the superabsorbent material to the fluid supply. The method can additionally include applying heat to the superabsorbent material. The heat can remove substantially all of the volatile hydrophobic coating from the superabsorbent material.

In still another embodiment, an absorbent material is provided. The absorbent material can include a superabsorbent material. The absorbent material can also include a volatile hydrophobic coating on the superabsorbent material. The volatile hydrophobic coating can include a melting point greater than 25° C. and a flash point less than 220° C.

BRIEF DESCRIPTION OF THE DRAWINGS

A full and enabling disclosure thereof, directed to one of ordinary skill in the art, is set forth more particularly in the remainder of the specification, which makes reference to the appended figures in which.

Figure 1:
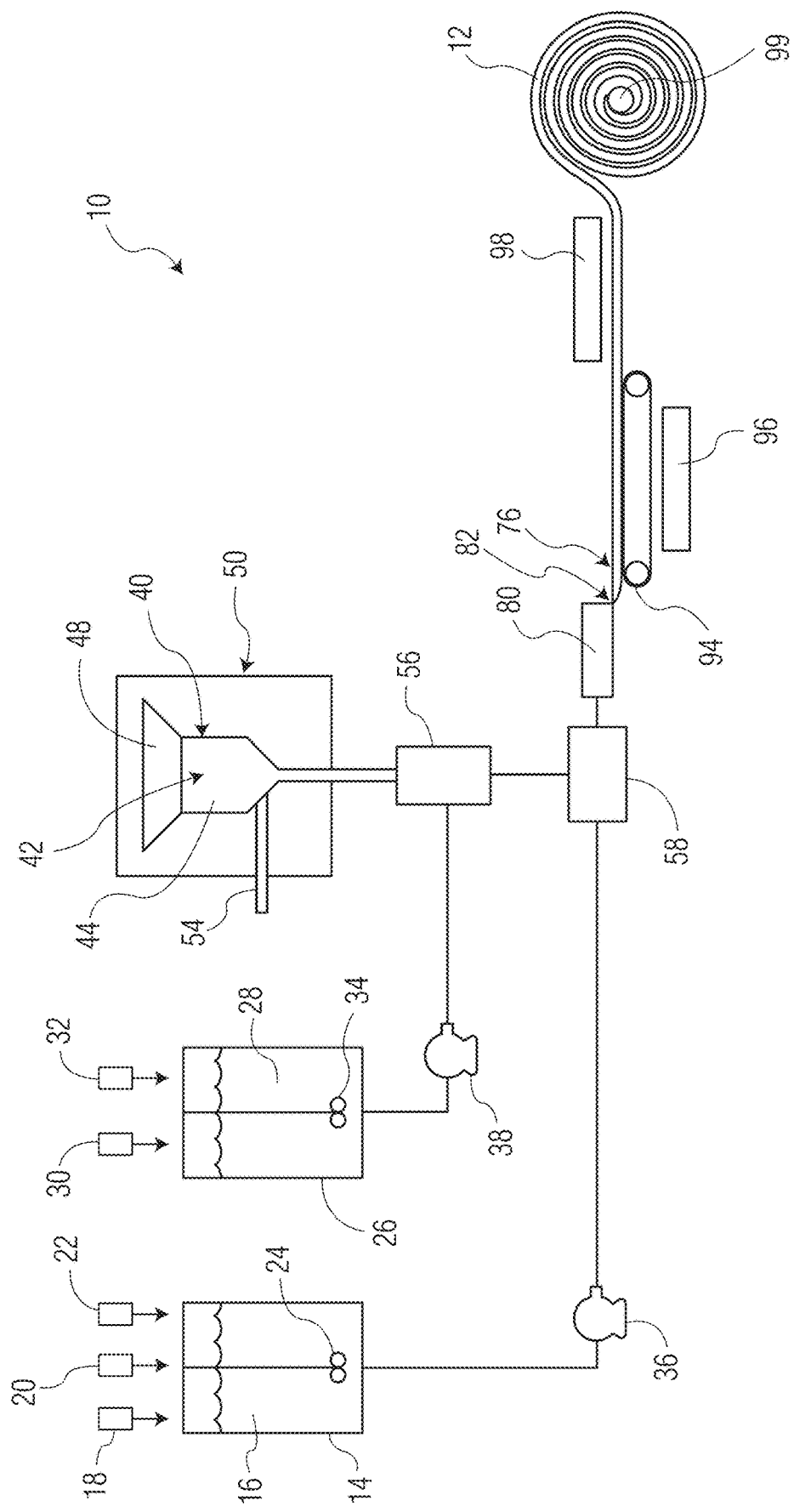
FIG. 1 is a process schematic of an exemplary method for introducing a component into a fluid supply and forming a substrate including a component according to one embodiment of the present disclosure.

Repeat use of reference characters in the present specification and drawings is intended to represent the same or analogous features or elements of the disclosure.

DETAILED DESCRIPTION OF THE DISCLOSURE

The present disclosure is directed to methods and apparatuses that can produce a substrate including a component. While the present disclosure provides examples of substrates manufactured through foam-forming processes, it is contemplated that the methods and apparatuses described herein may be utilized to benefit wet-laid and/or other manufacturing processes that include liquid exposure to components.

Each example is provided by way of explanation and is not meant as a limitation. For example, features illustrated or described as part of one embodiment or figure can be used on another embodiment or figure to yield yet another embodiment. It is intended that the present disclosure include such modifications and variations.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. As used herein, the terminology of "first," "second," "third", etc. does not designate a specified order, but is used as a means to differentiate between different occurrences when referring to various features in the present disclosure. Many modifications and variations of the present disclosure can be made without departing from the spirit and scope thereof. Therefore, the exemplary embodiments described herein should not be used to limit the scope of the invention.

Definitions

As used herein, the term "foam formed product" means a product formed from a suspension including a mixture of a solid, a liquid, and dispersed gas bubbles.

As used herein, the term "foam forming process" means a process for manufacturing a product involving a suspension including a mixture of a solid, a liquid, and dispersed gas bubbles.

As used herein, the term "foaming fluid" means any one or more known fluids compatible with the other components in the foam forming process. Suitable foaming fluids include, but are not limited to, water.

As used herein, the term "foam half life" means the time elapsed until the half of the initial frothed foam mass reverts to liquid water.

As used herein, the term "layer" refers to a structure that provides an area of a substrate in a z-direction of the substrate that is comprised of similar components and structure.

As used herein, the term "nonwoven web" means a web having a structure of individual fibers or threads which are interlaid, but not in an identifiable manner as in a knitted web.

As used herein, unless expressly indicated otherwise, when used in relation to material compositions the terms "percent", "%", "weight percent", or "percent by weight" each refer to the quantity by weight of a component as a percentage of the total except as whether expressly noted otherwise.

The term "personal care absorbent article" refers herein to an article intended and/or adapted to be placed against or in proximity to the body (i.e., contiguous with the body) of the wearer to absorb and contain various liquid, solid, and semi-solid exudates discharged from the body. Examples include, but are not limited to, diapers, diaper pants, training pants, youth pants, swim pants, feminine hygiene products, including, but not limited to, menstrual pads or pants, incontinence products (e.g., bed mats), medical garments, surgical pads and bandages, and so forth.

The term "ply" refers to a discrete layer within a multi-layered product wherein individual plies may be arranged in juxtaposition to each other.

The term "plied" or "bonded" or "coupled" refers herein to the joining, adhering, connecting, attaching, or the like, of two elements. Two elements will be considered plied, bonded or coupled together when they are joined, adhered, connected, attached, or the like, directly to one another or indirectly to one another, such as when each is directly bonded to intermediate elements. The plying, bonding or coupling of one element to another can occur via continuous or intermittent bonds.

The term "superabsorbent material" as used herein refers to water-swellable, water-insoluble organic or inorganic materials including superabsorbent polymers and superabsorbent polymer compositions capable, under the most favorable conditions, of absorbing at least about 10 times their weight, or at least about 15 times their weight, or at least about 25 times their weight in an aqueous solution containing 0.9 weight percent sodium chloride.

Method and Apparatus

In one embodiment, the present disclosure relates to a method and apparatus 10, 110, 210 that can form a substrate 12 including a component 44. In particular, the present disclosure relates to a method and apparatus 10, 110, 210 that can form a substrate 12 including a component 44 that includes a volatile hydrophobic coating 45 that helps protect the component 44 during the process of forming the substrate 12 in which the component 44 may be in contact with a liquid. The volatile hydrophobic coating 45 can advantageously be removed from the component 44 during processing of the substrate 12 once less liquid is present in the method of forming such substrate 12.

FIG. 1 provides a schematic of an exemplary apparatus 10 that can be used as part of a foam forming process to manufacture a substrate 12 that is a foam formed product. It can be appreciated that advantages and benefits as described herein can apply to methods of manufacturing a substrate including a component and that involve liquids in wet processes, but that are not foam forming processes. The apparatus 10 of FIG. 1 can include a first tank 14 configured for holding a first fluid supply 16. In some embodiments, the first fluid supply 16 can be a foam. The first fluid supply 16 can include a fluid provided by a supply of fluid 18. In some embodiments, the first fluid supply 16 can include a plurality fibers provided by a supply of fibers 20, however, in other embodiments, the first fluid supply 16 can be free from a plurality of fibers. The first fluid supply 16 can also include a surfactant provided by a supply of surfactant 22. In some embodiments, the first tank 14 can include a mixer 24, as will be discussed in more detail below. The mixer 24 can mix (e.g., agitate) the first fluid supply 16 to mix the fluid, fibers (if present), and surfactant with air, or some other gas, to create a foam. The mixer 24 can also mix the foam with fibers (if present) to create a foam suspension of fibers in which the foam holds and separates the fibers to facilitate a distribution of the fibers within the foam (e.g., as an artifact of the mixing process in the first tank 14). Uniform fiber distribution can promote desirable substrate 12 including, for example, strength and the visual appearance of quality.

The apparatus 10 can also include a second tank 26 configured for holding a second fluid supply 28. In some embodiments, the second fluid supply 28 can be a foam. The second fluid supply 28 can include a fluid provided by a supply of fluid 30 and a surfactant provided by a supply of surfactant 32. In some embodiments, the second fluid supply 28 can include a plurality of fibers in addition to or as an alternative to the fibers being present in the first fluid supply 16. In some embodiments, the second tank 26 can include a mixer 34. The mixer 34 can mix the second fluid supply 28 to mix the fluid and surfactant with air, or some other gas, to create a foam.

For either or both the first tank 14 and the second tank 26, the first fluid supply 16 or the second fluid supply 28 can be acted upon to form a foam. In some embodiments, the foaming fluid and other components are acted upon so as to form a porous foam having an air content greater than about 50% by volume and desirably an air content greater than about 60% by volume. In certain aspects, the highly-expanded foam is formed having an air content of between about 60% and about 95% and in further aspects between about 65% and about 85%. In certain embodiments, the foam may be acted upon to introduce air bubbles such that the ratio of expansion (volume of air to other components in the expanded stable foam) is greater than 1:1 and in certain embodiments the ratio of air:other components can be between about 1.1:1 and about 20:1 or between about 1.2:1 and about 15:1 or between about 1.5:1 and about 10:1 or even between about 2:1 and about 5:1.

The foam can be generated by one or more means known in the art. Examples of suitable methods include, without limitation, aggressive mechanical agitation such as by mixers 24, 34, injection of compressed air, and so forth. Mixing the components through the use of a high-shear, high-speed mixer is particularly well suited for use in the formation of the desired highly-porous foams. Various high-shear mixers are known in the art and believed suitable for use with the present disclosure. High-shear mixers typically employ a tank holding the foam precursor and/or one or more pipes through which the foam precursor is directed. The high-shear mixers may use a series of screens and/or rotors to work the precursor and cause aggressive mixing of the components and air. In a particular embodiment, the first tank 14 and/or the second tank 26 is provided having therein one or more rotors or impellors and associated stators. The rotors or impellors are rotated at high speeds in order to cause flow and shear. Air may, for example, be introduced into the tank at various positions or simply drawn in by the action of the mixers 24, 34. While the specific mixer design may influence the speeds necessary to achieve the desired mixing and shear, in certain embodiments suitable rotor speeds may be greater than about 500 rpm and, for example, be between about 1000 rpm and about 6000 rpm or between about 2000 rpm and about 4000 rpm. In certain embodiments, with respect to rotor based high-shear mixers, the mixer(s) 24, 34 may be run with the foam until the disappearance of the vortex in the foam or a sufficient volume increase is achieved.

In addition, it is noted the foaming process can be accomplished in a single foam generation step or in sequential foam generation steps for the first tank 14 and/or the second tank 26. For example, in one embodiment, all of the components of the first fluid supply 16 in the first tank 14 (e.g., the supply of the fluid 18, fibers 20, and surfactant 22) may be mixed together to form a slurry from which a foam is formed. Alternatively, one or more of the individual components may be added to the foaming fluid, an initial mixture formed (e.g. a dispersion or foam), after which the remaining components may be added to the initially foamed slurry and then all of the components acted upon to form the final foam. In this regard, the fluid 18 and surfactant 22 may be initially mixed and acted upon to form an initial foam prior to the addition of any solids. Fibers, if desired, may then be added to the water/surfactant foam and then further acted upon to form the final foam. As a further alternative, the fluid 18 and fibers 20, such as a high density cellulose pulp sheet, may be aggressively mixed at a higher consistency to form an initial dispersion after which the foaming surfactant, additional water and other components, such as synthetic fibers, are added to form a second mixture which is then mixed and acted upon to form the foam.

The foam density of the foam forming the first fluid supply 16 in the first tank 14 and/or the foam forming the second fluid supply 28 in the second tank 26 can vary depending upon the particular application and various factors, such as the fiber stock used. In some implementations, for example, the foam density of the foam can be greater than about 100 g/L, such as greater than about 250 g/L, such as greater than about 300 g/L. The foam density is generally less than about 800 g/L, such as less than about 500 g/L, such as less than about 400 g/L, such as less than about 350 g/L. In some implementations, for example, a lower density foam is used having a foam density of generally less than about 350 g/L, such as less than about 340 g/L, such as less than about 330 g/L.

The apparatus 10 can also include a first pump 36 and a second pump 38. The first pump 36 can be in fluid communication with the first fluid supply 16 and can be configured for pumping the first fluid supply 16 to transfer the first fluid supply 16. The second pump 38 can be in fluid communication with the second fluid supply 28 and can be configured for pumping the second fluid supply 28 to transfer the second fluid supply 28. In some embodiments, the first pump 36 and/or the second pump 38 can be a progressive cavity pump or a centrifugal pump, however, it is contemplated that other suitable types of pumps can be used.

Figure 2:
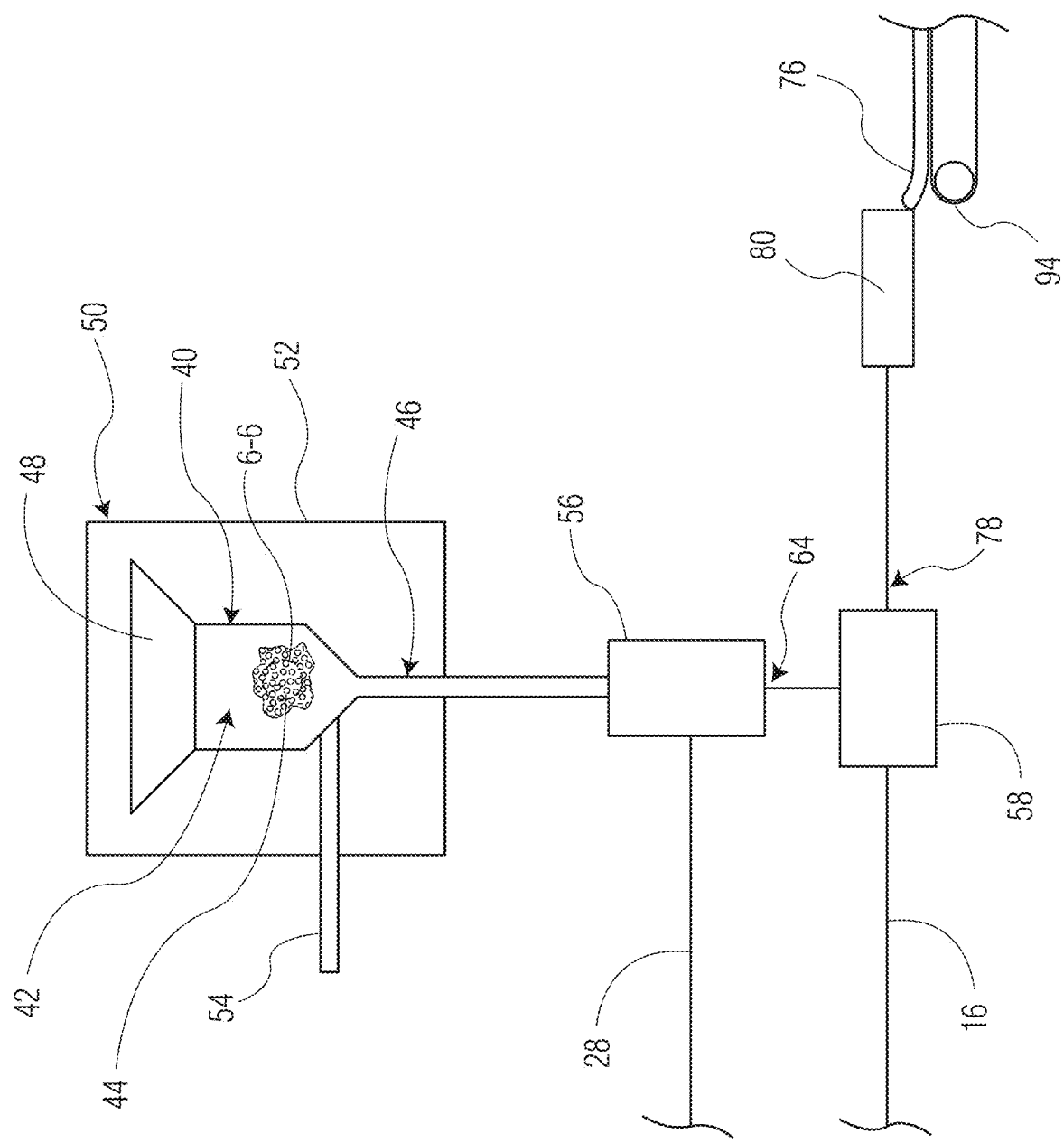
FIG. 2 is a detailed schematic of the component feed system, two mixing junctions, and two fluid supplies upstream of the headbox as depicted from the process schematic in FIG. 1.

As depicted in FIGS. 1 and 2, the apparatus 10 can also include a component feed system 40. The component feed system 40 can include a component supply area 42 for receiving a supply of a component 44 as shown in the partial cut-away portion of the component supply area 42 illustrated in FIG. 2, with the supply of the component 44 being further shown in the detailed view in FIG. 6. The component feed system 40 can also include an outlet conduit 46. The outlet conduit 46 can be circular in cross-sectional shape, or can be configured in a rectangular fashion such as to form a slot. The component feed system 40 can also include a hopper 48. The hopper 48 can be coupled to the component supply area 42 and can be utilized for refiling the supply of the component 44 to the component supply area 42.

In some embodiments, the component feed system 40 can include a bulk solids pump. Some examples of bulk solids pumps that may be used herein can include systems that utilize screws/augers, belts, vibratory trays, rotating discs, or other known systems for handling and discharging the supply of the component 44. Other types of feeders can be used for the component feed system 40, such as, for example, an ingredient feeder, such as those manufactured by Christy Machine & Conveyor, Fremont, Ohio. The component feed system 40 can also be configured as a conveyor system in some embodiments.

The component feed system 40 can also include a pressure control system 50. In some embodiments, the pressure control system 50 can include a housing 52. The housing 52 can form a pressurized seal volume around the component feed system 40. In other embodiments, the pressure control system 50 can be formed as an integral part to the structure component feed system 40 itself, such that a separate housing 52 surrounding the component feed system 40 may not be required. The pressure control system 50 can also include a bleed orifice 54 in some embodiments.

The supply of the component 44 can be in the form of a particulate and/or a fiber. In one embodiment as described herein, the supply of the component 44 can be superabsorbent material (SAM) in particulate form. In some embodiments, SAM can be in the form of a fiber. Of course, other types of components, as described further below, are also contemplated as being utilized in the apparatus 10 and methods as described herein. The component feed system 40 as described herein can be particularly beneficial for a supply of component 44 that is most suitably maintained in a dry environment with minimal of exposure to fluid or foam utilized in the apparatus 10 and methods described herein.

Figure 6:
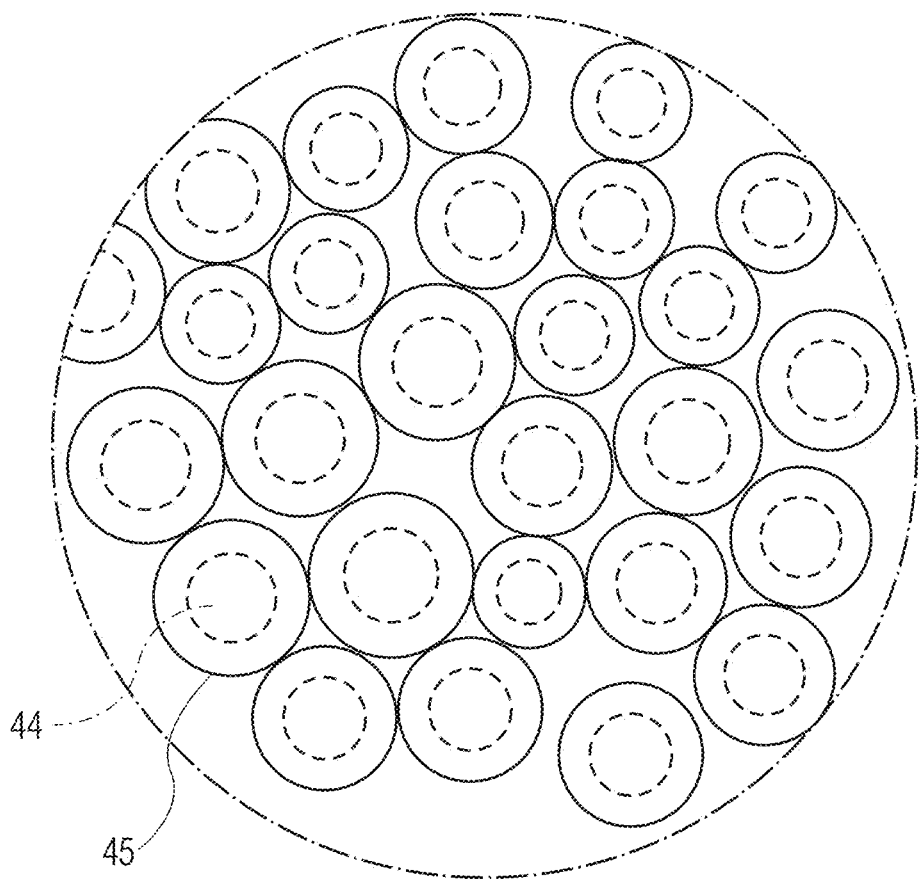
FIG. 6 is a detailed view taken from FIG. 2.

As discussed further below and as illustrated in FIG. 6, the supply of the component 44 can include a volatile hydrophobic coating 45 to help protect the component from liquid in any fluid supply it is to be mixed with, such as the second fluid supply 28.

Figure 3:
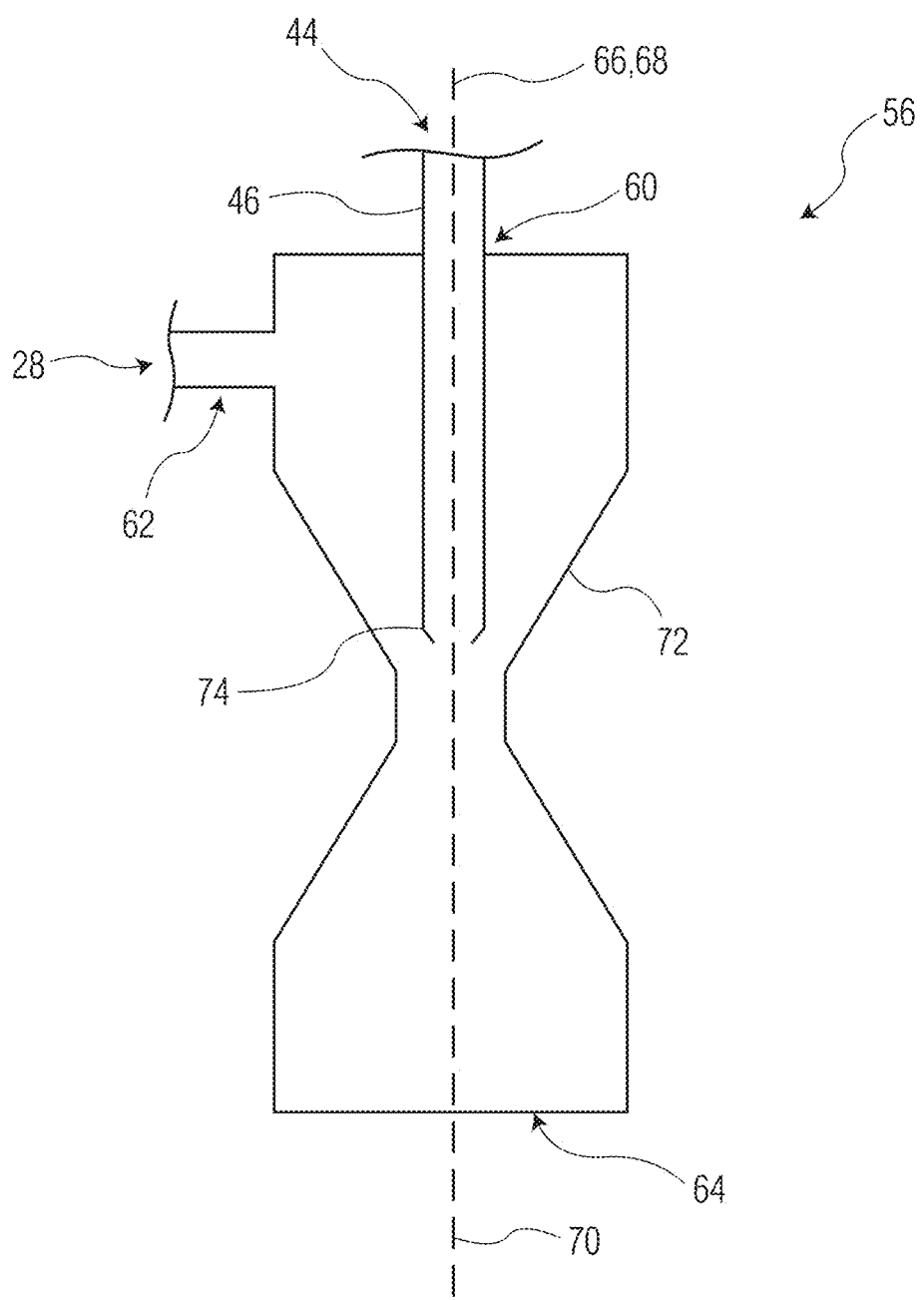
FIG. 3 is a cross-section of the first mixing junction and outlet conduit of the component feed system of FIG. 2.

Referring to FIGS. 1-3, in some embodiments, the apparatus 10 and methods described herein can include a first mixing junction 56 and a second mixing junction 58. In preferred embodiments, the first mixing junction 56 can be an eductor (also commonly referred to as a jet pump). The first mixing junction 56 can be in fluid communication with the outlet conduit 46 of the component feed system 40 and in fluid communication with the second fluid supply 28. As depicted in FIG. 3, the first mixing junction 56 can include a first inlet 60 and a second inlet 62. The first inlet 60 can be in fluid communication with the supply of the component 44 via the outlet conduit 46. The second inlet 62 can be in fluid communication with the second fluid supply 28. The first mixing junction 56 can also include a discharge 64.

In preferred embodiments, the first mixing junction 56 can be configured as a co-axial eductor. For example, in a preferred embodiment, the first mixing junction 56 can be configured such that the first inlet axis 66 of the first inlet 60 of the first mixing junction 56 is co-axial with the outlet axis 68 of outlet conduit 46 that provides the supply of the component 44, as illustrated in FIG. 3. The first mixing junction 56 can also be configured such that the discharge axis 70 of the discharge 64 is co-axial with the outlet axis 68 of the outlet conduit 46. As such, the first mixing junction 56 can be configured such that the first inlet axis 66 of the first inlet 60 can be co-axial with the discharge axis 70 of the discharge 64 of the first mixing junction 56. The second inlet 62 providing the second fluid supply 28 to the first mixing junction 56 can be set up to enter the first mixing junction 56 on a side of the first mixing junction 56. This configuration of having the supply of the component 44 be delivered in the first inlet 60 in a co-axial fashion to the discharge axis 70, rather than having the second fluid supply 28 entering at the first inlet 60, is opposite of most eductor configurations that are mixing a fluid supply and a component using a motive force of the fluid supply, but provides advantages to the first mixing junction 56 as described herein.

When configured as an eductor, the first mixing junction 56 can mix the supply of the component 44 from the component feed system 40 with the second fluid supply 28. By transferring the second fluid supply 28 into the first mixing junction 56 at the second inlet 62 and through the first mixing junction 56, the second fluid supply 28 provides a motive pressure to the supply of the component 44. The motive pressure can create a vacuum on the supply of the component 44 and the component feed system 40 to help draw the supply of the component 44 to mix and be entrained in the second fluid supply 28. In some embodiments, the motive pressure can create a vacuum on the supply of the component 44 of less than 1.5 in Hg, however, in other embodiments, the motive pressure could create a vacuum on the supply of the component 44 of 5 in. Hg or more, or 10 in Hg or more.

The pressure control system 50 can help manage proper distribution and entrainment of the supply of the component 44 to the second fluid supply 28. For example, when the second fluid supply 28 creates a motive pressure on the component feed system 40, the vacuum pulling on the supply of the component 44 may cause additional air to be entrained in the second fluid supply 28. In some circumstances, entraining additional air in the second fluid supply 28 may be desired, however, in other circumstances, it may be desirable to control the gas content of the second fluid supply 28 while inputting the supply of the component 44 to the second fluid supply 28 at the first mixing junction 56. For example, in some circumstances where the second fluid supply 28 is a foam, the amount of gas content in the foam may be desired to be kept relatively fixed as the foam passes through the first mixing junction 56. Thus, the pressure control system 50 can control the pressure on the component feed system 40 to help counteract the motive pressure on the supply of the component 44 and the component feed system 40 created by the second fluid supply 28.

In some embodiments, the pressure control system 50 can include sealing off the component feed system 40. For example, as discussed above, the pressure control system 50 can include a housing 52 to provide a seal on the component feed system 40. Sealing the component feed system 40 can help to prevent additional air entrainment in the second fluid supply 28 when the supply of the component 44 is introduced into the second fluid supply 28 in the first mixing junction 56.

However, in some embodiments, it may be beneficial to also include additional capability to the pressure control system 50. For example, in some embodiments, the pressure control system 50 can include a bleed orifice 54. The bleed orifice 54 can be configured to bleed-in pressure, such as atmospheric air pressure, to provide additional pressure control of the component feed system 40. It has been discovered that by providing a bleed-in orifice 54 to provide some bleed-in of atmospheric air pressure to the component feed system 40, back-splashing of the second fluid supply 28 in the first mixing junction 56 can be reduced or eliminated. Reducing back-splashing of the second fluid supply 28 in the first mixing junction 56 can help prevent the component feed system 40 from becoming clogged or needing to be cleaned, especially where the component feed system 40 may be delivering a dry component, such as particulate SAM.

Additionally or alternatively, the pressure control system 50 can be configured to provide additional positive pressure to prevent back-filling of the component feed system 40 in some circumstances, such as if a downstream obstruction occurs in the apparatus 10 beyond the first mixing junction 56. In such a case of an obstruction creating an increased pressure, the second fluid supply 28 may have a desire to back-fill the component feed system 40. Back-filling of fluid into the component feed system 40 can be detrimental to processing, especially where the supply of the component 44 is a component best kept in dry conditions, such as SAM. A pressure control system 50 configured to be able to provide positive pressure to the component feed system 40 can help prevent such back-filling of the component feed system 40.

It is also contemplated that other additional aspects of a pressure control system 50 could be utilized to maintain the pressure to a suitable level for the component feed system 40, including, but not limited to, supplying vacuum to the component feed system 40 in addition to or alternative to the air bleed-in at the bleed orifice 54 and/or the positive pressure described above.

As depicted in FIG. 3, in some embodiments, the first mixing junction 56 can also include a venturi section 72. The venturi section 72 can be a necked region of the first mixing junction 56 that can increase the velocity of the second fluid supply 28 passing through the venturi section 72, and thus, can increase the motive pressure created by the second fluid supply 28 on the supply of the component 44 in the component feed system 40. In some embodiments, the distal end 74 of the outlet conduit 46 providing the supply of the component 44 to the first mixing junction 56 can be disposed in the venturi section 72. The location of the distal end 74 of the outlet conduit 46 can be adjusted within the venturi section 72 as one way to control the pressure of the second fluid supply 28 as it is discharged from the first mixing junction 56.

The first mixing junction 56 can also provide pressure control on the transfer of the second fluid supply 28 including the component 44 as it exits the discharge 64 of the first mixing junction 56 as compared to when the second fluid supply 28 enters the first mixing junction 56. The second fluid supply 28 can be transferred at a second fluid pressure prior to the first mixing junction 56. The second fluid supply 28 including the component from the supply of the component 44 can exit the discharge 64 of the first mixing junction 56 at a discharge pressure. The pressure difference between the second fluid pressure prior to the first mixing junction 56 and the discharge pressure can be controlled. In some embodiments, this pressure difference can be controlled by varying the flow rate of the second fluid supply 28. In some embodiments, this pressure difference can be controlled by the location of the distal end 74 of the outlet conduit 46 in the venturi section 72 of the first mixing junction 56. For example, if the distal end 74 of the outlet conduit 46 is moved further into the venturi section 72, the area for the second fluid supply 28 to flow through the venturi section 72 is reduced, and thus, the discharge pressure of the second fluid supply 28 including the component 44 exiting the first mixing junction 56 is increased. If the distal end 74 of the outlet conduit 46 is moved further out of the venturi section 72 (i.e., back towards the component feed system 40), the area for the second fluid supply 28 to flow through the venturi section 72 is increased, and thus, the discharge pressure of the second fluid supply 28 including the component 44 exiting the first mixing junction 56 is decreased. In some embodiments, it is preferable to control the pressure difference between the second fluid pressure prior to the first mixing junction 56 and the discharge pressure to be less than or equal to 5 pounds per square inch.

Another feature of the first mixing junction 56 that can create enhanced mixing and transfer of the supply of the component 44 into the second fluid supply 28 in the first mixing junction 56 can be that the second inlet 62 providing the second fluid supply 28 is upstream of the distal end 74 of the outlet conduit 46 that provides the supply of the component 44 from the component feed system 40 to the first mixing junction 56. With such a configuration, the second fluid supply 28 can enter the first mixing junction 56 upstream of the supply of the component 44 to prevent any of the supply of the component 44 from engaging or sticking on an internal surface of the first mixing junction 56. Thus, in the embodiment depicted in FIG. 3, the co-axial nature of the outlet axis 68 of the outlet conduit 46 and the discharge axis 70 of the first mixing junction 56 and the upstream entry of the second fluid supply 28 into the first mixing junction 56 can create an annular-shaped fluid protection around the entry of the supply of the component 44 as it is entrained in the second fluid supply 28 in the first mixing junction 56.

It is to be noted that while a single outlet conduit 46 of the component feed system 40 and a single first mixing junction 56 is illustrated in FIGS. 1-3, it is contemplated that the outlet conduit 46 can be split into two or more conduits to feed two or more first mixing junctions 56 for mixing the supply of the component 44 with the second fluid supply 28. In such a configuration, the second fluid supply 28 can include as many conduits as there are first mixing junctions 56. By having more than one outlet conduit 46 and more than one first mixing junction 56 to mix the supply of the component 44 with the second fluid supply 28, a greater flow rate of the second fluid supply 28 including the component from the supply of the component 44 can be achieved.

Referring back to FIG. 1, the apparatus 10 can include a second mixing junction 58. The second mixing junction 58 can provide the functionality of mixing the second fluid supply 28 including the component from the supply of the component 44 with the first fluid supply 16. As the second fluid supply 28 including the component from the supply of the component 44 exits the discharge 64 of the first mixing junction 56 it can be transferred to the second mixing junction 58. The first fluid supply 16 can be delivered to the second mixing junction 58 by the first pump 36. The second mixing junction 58 can mix the first fluid supply 16 and any of its components (e.g., fluid 18, fibers 20, surfactant 22) with the second fluid supply 28 and any of its components (e.g., fluid 30, surfactant 32) and the component from the supply of the component 44 to provide a resultant slurry 76. The resultant slurry 76 can be transferred from the second mixing junction 58 through a discharge 78 of the second mixing junction 58 and to a headbox 80. In some embodiments, there can be a separation between the discharge 78 of the second mixing junction 58 and the headbox 80, as depicted in FIG. 3. However, in other embodiments, the discharge 78 of the second mixing junction 58 can be integral with the headbox 80.

Figure 4:
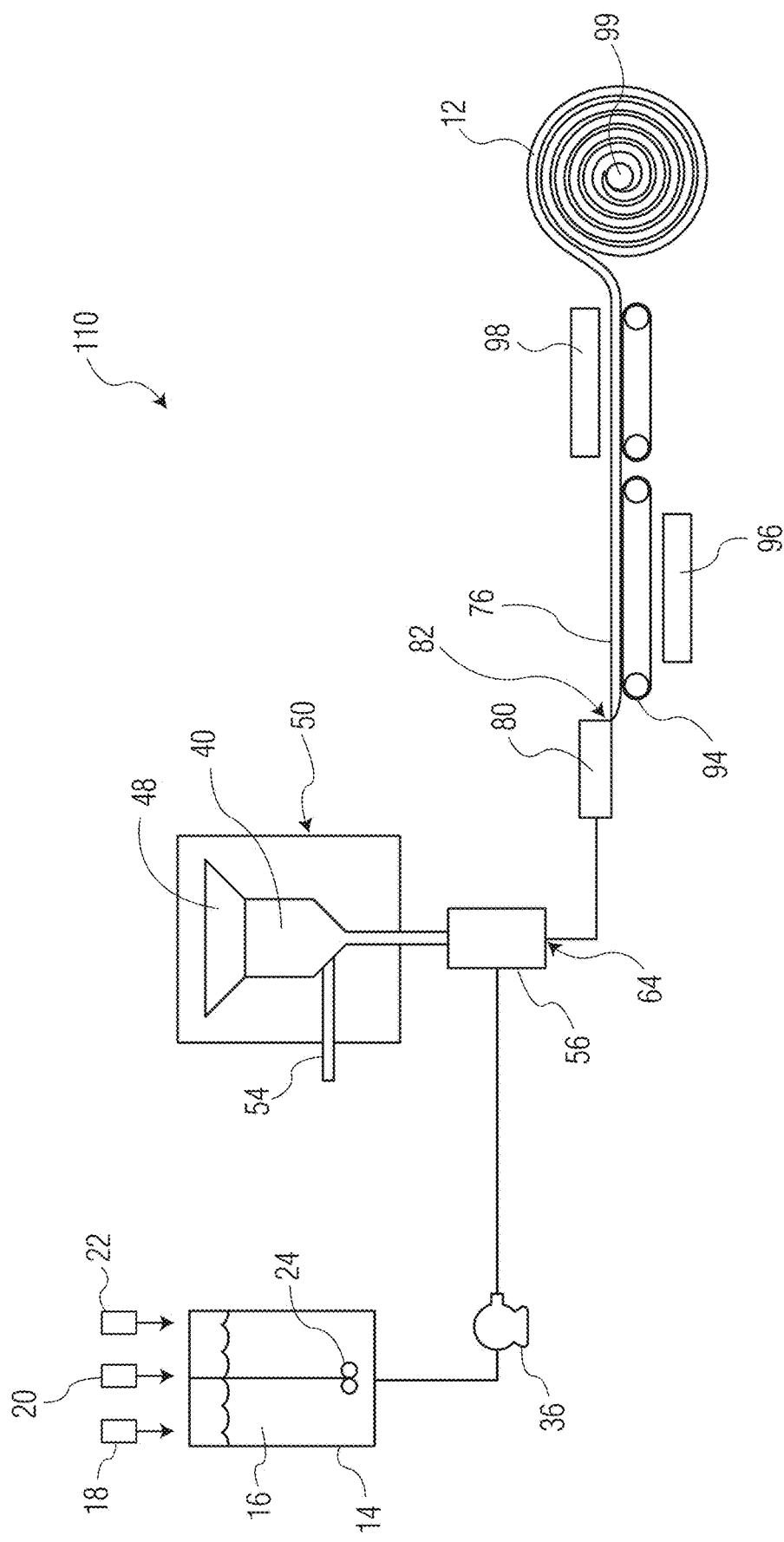
FIG. 4 is a process schematic of an alternative exemplary method for introducing a component into a fluid supply and forming a substrate including a component according to another embodiment of the present disclosure.

An alternative embodiment of an apparatus 110 and method of forming a substrate 12 is depicted in FIG. 4. FIG. 4 has the same components as the apparatus 10 and method as described in FIGS. 1-3 unless noted herein. The apparatus 110 of FIG. 4 only includes a first tank 14 for holding a first fluid supply 16. The apparatus 110 and method of FIG. 4 does not include a second tank 26 including a second fluid supply 28. The first fluid supply 16 can include a supply of fluid 18, a supply of fibers 20, and a supply of surfactant 22. The apparatus 110 can also include a component feed system 40, a pressure control system 50, and a mixing junction 56 as described above with respect to FIGS. 1-3. Based on this configuration, the first pump 36 can transfer the first fluid supply 16 to the first mixing junction 56. The component feed system 40 can transfer a supply of component 44 to the first mixing junction 56 as previously described. In preferred embodiments, the first mixing junction 56 can be an eductor, and more preferably, a co-axial eductor as described with respect to FIG. 3. The first mixing junction 56 can mix the first fluid supply 16 with component from the supply of the component 44 and provide a resultant slurry 76 that exits the discharge 64 of the first mixing junction 56 and is transferred to the headbox 80. In some embodiments, the discharge 64 of the first mixing junction 56 can be separate from the headbox 80, however, in some embodiments, the discharge 64 of the first mixing junction 56 can be integral to the headbox 80.

Regardless of whether the apparatus 10, 110 and method used for transferring the resultant slurry 76 is as described herein, or is another apparatus and/or method, a headbox 80 can be provided to further transfer the resultant slurry 76 to form a substrate 12. The headbox 80 can be used to spread the resultant slurry 76 to a forming surface 94.

Referring back to FIGS. 1 and 4, the apparatus 10, 110 can also include a forming surface 94 onto which the resultant slurry 76 is deposited after exiting the outlet 82 of the headbox 80. The forming surface 94 can be a foraminous sheet, such as a woven belt or screen, or any other suitable surface for accepting the resultant slurry 76. The apparatus 10, 110 can also include a dewatering system 96 that can be configured to remove liquid from the resultant slurry 76 on the forming surface 94. In some embodiments, the dewatering system 96 can be configured to provide a vacuum to the resultant slurry 76 to pull liquid from the resultant slurry 76, and in doing so, can turn the resultant slurry 76 including the plurality of fibers 20 and the component 44 into a substrate 12.

Figure 5:
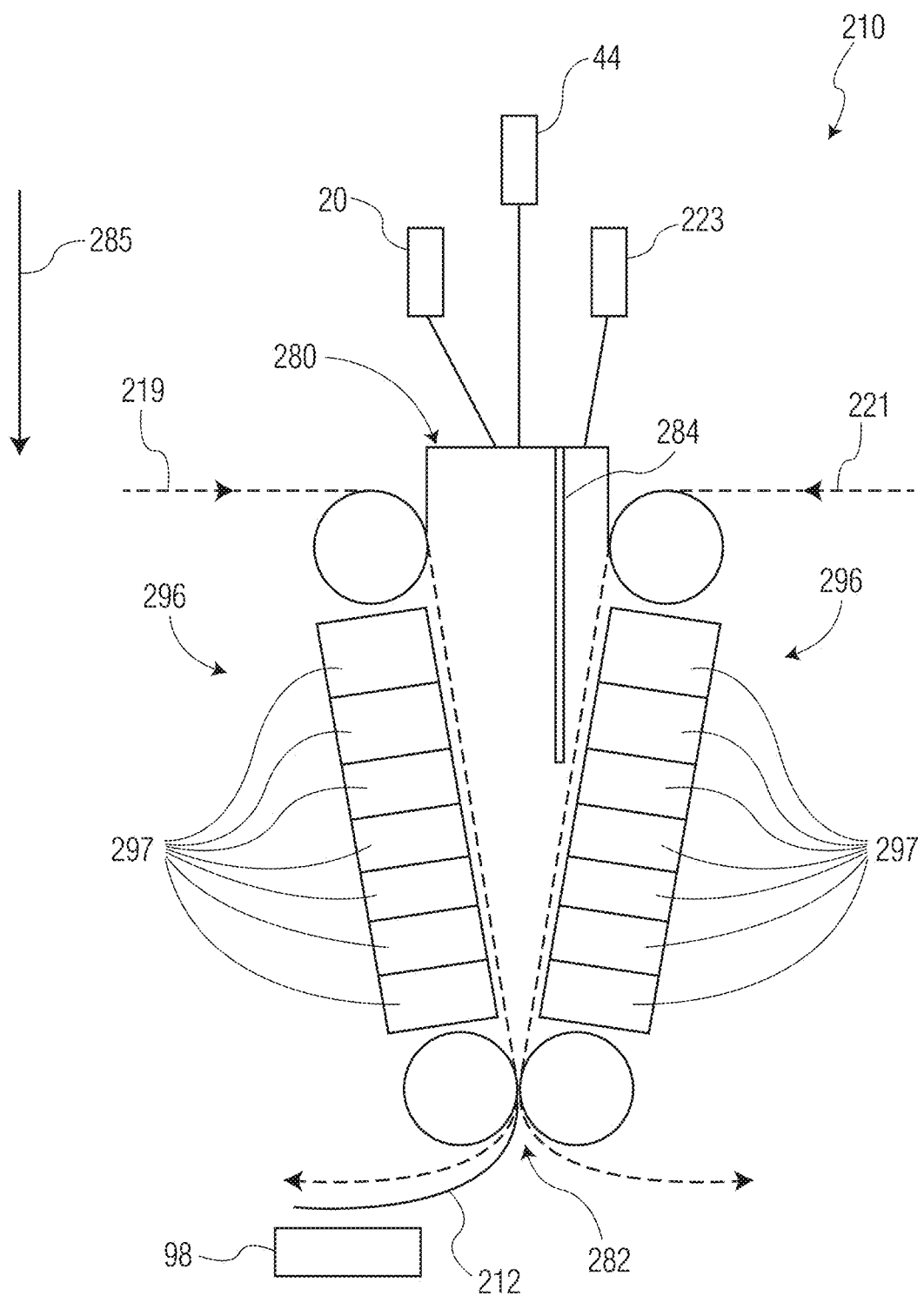
FIG. 5 is a side plan view of an alternative headbox that can be used in the method for introducing a component in a fluid supply and forming a substrate including the component.

Another alternative embodiment for an apparatus 210 and method for forming a substrate 12 including a component 44 is illustrated in FIG. 5. The apparatus 210 of FIG. 5 can be used part of a similar foam forming process as described above with respect to FIGS. 1-4, however, the headbox 280 is a vertical twin former as is known in the art. The headbox 280 can include first and second foraminous elements 219, 221. The first and second foraminous elements 219, 221 can help define an interior volume of the headbox 280. The apparatus 210 can include a dewatering system 296 that can include a series of vacuum elements 297 disposed adjacent each foraminous element 219, 221. In some embodiments, the headbox 280 can also include a divider 284 that can be beneficial in separating various fibers and/or components in the headbox 280 during formation.

A first supply of fibers 20 can be supplied to the headbox 280. The supply of the component 44 can also be supplied directly to the headbox 280. The component 44 can include a volatile hydrophobic coating 45. In some embodiments, a second supply of fibers 223 can be provided to the headbox 280. The fibers 20, 223 and component 44 can be processed through the headbox 280 in a machine direction 285 towards the outlet 282 of the headbox 280 to provide a substrate 12, similar to the apparatuses 10, 110, described in FIGS. 1 and 4, respectively.

The apparatuses 10, 110, 210 as described herein can also include a drying system 98. For purposes of simplicity, the drying system 98 will be described in FIG. 1, however, this discussion can apply to the drying system 98 of the apparatus 110 of FIG. 4 and the drying system 98 of the apparatus 210 of FIG. 5. The drying system 98 can be configured to further dry and/or cure the substrate 12. The drying system 98 can apply heat to the substrate 12, such as by providing heated air in a through-air drying system. In some embodiments, the drying system 98 can supply heat at temperatures from about 150° C. to about 350° C., or more preferably from about 150° C. to about 250° C.

In addition to drying the substrate 12, the heat supplied by the drying system 98 and the time exposure that the substrate 12 has to the heat can be manipulated to be able to remove the volatile hydrophobic coating 45 from the component 44 in the substrate 12 such that substantially all of the volatile hydrophobic coating 45 is removed. As used herein, removing substantially all of the volatile hydrophobic coating 45 from the component 44 means that at least about 90% of the volatile hydrophobic coating 45 is removed from the component 44 (by weight). In preferred embodiments, at least about 95%, or at least about 96%, or at least about 97%, or at least about 98%, or at least about 99% of the volatile hydrophobic coating 45 can be removed from the component 44 (by weight).

As discussed in more detail below, the volatile hydrophobic coating 45 can be heated to a temperature above its melting point, but below the flash point, for coating it onto the component 44. Further, the volatile hydrophobic coating 45 can be removed from the component 44 by heating it to a temperature above its flash point, but below its boiling point. Preferably, the volatile hydrophobic coating 45 can be selected to have a wide temperature range between its flash point and its boiling point. In doing so, the coating 45 can protect the component 44 from liquids while the component 44 is transferred and implemented in processes including a liquid as described herein in formation of the substrate 12, yet the coating 45 can be removed after most of the liquid from the processes is no longer present so that the component 44 can function as intended in the substrate 12. Advantageously, the coating 45 can be selected such that the coating 45 can be removed by drying systems 98 producing operating temperatures that can already be used for drying and curing the substrate 12.

In some embodiments, the apparatus 10, 110 can include a winding system 99 that can be configured to wind the substrate 12 in a roll fashion. In other embodiments, the apparatus 10, 110 can festoon the substrate 12, or collect the substrate 12 in any other suitable configuration. Although not pictured in FIG. 5, the apparatus 210 can also include a winding system 99.

Foaming Fluid

The foam forming processes as described herein can include a foaming fluid. In some embodiments, the foaming fluid can comprise between about 85% to about 99.99% of the foam (by weight). In some embodiments, the foaming fluid used to make the foam can comprise at least about 85% of the foam (by weight). In certain embodiments, the foaming fluid can comprise between about 90% and about 99.9% % of the foam (by weight). In certain other embodiments, the foaming fluid can comprise between about 93% and 99.5% of the foam or even between about 95% and about 99.0% of the foam (by weight). In preferred embodiments, the foaming fluid can be water, however, it is contemplated that other processes may utilize other foaming fluids.

Foaming Surfactant

The foam forming processes as described herein can utilize one of more surfactants. The fibers and surfactant, together with the foaming liquid and any additional components, can form a stable dispersion capable of substantially retaining a high degree of porosity for longer than the drying process. In this regard, the surfactant is selected so as to provide a foam having a foam half life of at least 2 minutes, more desirably at least 5 minutes, and most desirably at least 10 minutes. A foam half life can be a function of surfactant types, surfactant concentrations, foam compositions/solid level and mixing power/air content in a foam. The foaming surfactant used in the foam can be selected from one or more known in the art that are capable of providing the desired degree of foam stability. In this regard, the foaming surfactant can be selected from anionic, cationic, nonionic and amphoteric surfactants provided they, alone or in combination with other components, provide the necessary foam stability, or foam half life. As will be appreciated, more than one surfactant can be used, including different types of surfactants, as long as they are compatible, and more than one surfactant of the same type. For example, a combination of a cationic surfactant and a nonionic surfactant or a combination of an anionic surfactant and a nonionic surfactant may be used in some embodiments due to their compatibilities. However, in some embodiments, a combination of a cationic surfactant and an anionic surfactant may not be satisfactory to combine due to incompatibilities between the surfactants.

Anionic surfactants believed suitable for use with the present disclosure include, without limitation, anionic sulfate surfactants, alkyl ether sulfonates, alkylaryl sulfonates, or mixtures or combinations thereof. Examples of alkylaryl sulfonates include, without limitation, alkyl benzene sulfonic acids and their salts, dialkylbenzene disulfonic acids and their salts, dialkylbenzene sulfonic acids and their salts, alkylphenol sulfonic acids/condensed alkylphenol sulfonic acids and their salts, or mixture or combinations thereof. Examples of additional anionic surfactants believed suitable for use in the present disclosure include alkali metal sulforicinates, sulfonated glyceryl esters of fatty acids such as sulfonated monoglycerides of coconut oil acids, salts of sulfonated monovalent alcohol esters such as sodium oleylisethianate, metal soaps of fatty acids, amides of amino sulfonic acids such as the sodium salt of oleyl methyl tauride, sulfonated products of fatty acids nitriles such as palmitonitrile sulfonate, alkali metal alkyl sulfates such as sodium lauryl sulfate, ammonium lauryl sulfate or triethanolamine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, sulphuric esters of polyoxyethylene alkyl ether, sodium salts, potassium salts, and amine salts of alkylnapthylsulfonic acid. Certain phosphate surfactants including phosphate esters such as sodium lauryl phosphate esters or those available from the Dow Chemical Company under the tradename TRITON are also believed suitable for use herewith. A particularly desired anionic surfactant is sodium dodecyl sulfate (SDS).

Cationic surfactants are also believed suitable for use with the present disclosure for manufacturing some embodiments of substrates. In some embodiments, such as those including superabsorbent material, cationic surfactants may be less preferable to use due to potential interaction between the cationic surfactant(s) and the superabsorbent material, which may be anionic. Foaming cationic surfactants include, without limitation, monocarbyl ammonium salts, dicarbyl ammonium salts, tricarbyl ammonium salts, monocarbyl phosphonium salts, dicarbyl phosphonium salts, tricarbyl phosphonium salts, carbylcarboxy salts, quaternary ammonium salts, imidazolines, ethoxylated amines, quaternary phospholipids and so forth. Examples of additional cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such as undecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides, dioctadecyldimethylammonium hydroxide, tallow trimethylammonium hydroxide, trimethylammonium hydroxide, methylpolyoxyethylene cocoammonium chloride, and dipalmityl hydroxyethylammonium methosulfate, amide derivatives of amino alcohols such as beta-hydroxylethylstearylamide, and amine salts of long chain fatty acids. Further examples of cationic surfactants believed suitable for use with the present disclosure include benzalkonium chloride, benzethonium chloride, cetrimonium bromide, distearyldimethylammonium chloride, tetramethylammonium hydroxide, and so forth.

Nonionic surfactants believed suitable for use in the present disclosure include, without limitation, condensates of ethylene oxide with a long chain fatty alcohol or fatty acid, condensates of ethylene oxide with an amine or an amide, condensation products of ethylene and propylene oxides, fatty acid alkylol amide and fatty amine oxides. Various additional examples of non-ionic surfactants include stearyl alcohol, sorbitan monostearate, octyl glucoside, octaethylene glycol monododecyl ether, lauryl glucoside, cetyl alcohol, cocamide MEA, monolaurin, polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol, alkylpolysaccharides, polyethylene glycol sorbitan monooleate, octylphenol ethylene oxide, and so forth.

The foaming surfactant can be used in varying amounts as necessary to achieve the desired foam stability and air-content in the foam. In certain embodiments, the foaming surfactant can comprise between about 0.005% and about 5% of the foam (by weight). In certain embodiments the foaming surfactant can comprise between about 0.05% and about 3% of the foam or even between about 0.05% and about 2% of the foam (by weight).

Fibers

As noted above, the apparatus 10, 110, 210 and methods described herein can include providing a fibers from a supply of fibers 20, 223. In some embodiments, the fibers can be suspending in a fluid supply 16, 28 that can be a foam. The foam suspension of fibers can provide one or more supply of fibers. In some embodiments, the fibers utilized herein can include natural fibers and/or synthetic fibers. In some embodiments, a fiber supply 20 can include only natural fibers or only synthetic fibers. In other embodiments, a fiber supply 20 can include a mixture of natural fibers and synthetic fibers. Some fibers being utilized herein can be absorbent, whereas other fibers utilized herein can be non-absorbent. Non-absorbent fibers can provide features for the substrates that are formed from the methods and apparatuses described herein, such as improved intake or distribution of fluids.

A wide variety of cellulosic fibers are believed suitable for use herein. In some embodiments, the fibers utilized can be conventional papermaking fibers such as wood pulp fibers formed by a variety of pulping processes, such as kraft pulp, sulfite pulp, bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), and so forth. By way of example only, fibers and methods of making wood pulp fibers are disclosed in U.S. Pat. No. 4,793,898 to Laamanen et al.; U.S. Pat. No. 4,594,130 to Chang et al.; U.S. Pat. No. 3,585,104 to Kleinhart; U.S. Pat. No. 5,595,628 to Gordon et al.; U.S. Pat. No. 5,522,967 to Shet; and so forth. Further, the fibers may be any high-average fiber length wood pulp, low-average fiber length wood pulp, or mixtures of the same. Examples of suitable high-average length pulp fibers include softwood fibers, such as, but not limited to, northern softwood, southern softwood, redwood, red cedar, hemlock, pine (e.g., southern pines), spruce (e.g., black spruce), and the like. Examples of suitable low-average length pulp fibers include hardwood fibers, such as, but not limited to, *eucalyptus*, maple, birch, aspen, and the like.

Moreover, if desired, secondary fibers obtained from recycled materials may be used, such as fiber pulp from sources such as, for example, newsprint, reclaimed paperboard, and office waste. In a particularly preferred embodiment refined fibers are utilized in the tissue web such that the total amount of virgin and/or high average fiber length wood fibers, such as softwood fibers, may be reduced.

Regardless of the origin of the wood pulp fiber, the wood pulp fibers preferably have an average fiber length greater than about 0.2 mm and less than about 3 mm, such as from about 0.35 mm and about 2.5 mm, or between about 0.5 mm to about 2 mm or even between about 0.7 mm and about 1.5 mm.

In addition, other cellulosic fibers that can be used in the present disclosure includes nonwoody fibers. As used herein, the term "non-wood fiber" generally refers to cellulosic fibers derived from non-woody monocotyledonous or dicotyledonous plant stems. Non-limiting examples of dicotyledonous plants that may be used to yield non-wood fiber include kenaf, jute, flax, ramie and hemp. Non-limiting examples of monocotyledonous plants that may be used to yield non-wood fiber include cereal straws (wheat, rye, barley, oat, etc.), stalks (corn, cotton, sorghum, Hesperaloe funifera, etc.), canes (bamboo, sisal, bagasse, etc.) and grasses (*miscanthus*, esparto, lemon, sabai, switchgrass, etc). In still other certain instances non-wood fiber may be derived from aquatic plants such as water hyacinth, microalgae such as *Spirulina*, and macroalgae seaweeds such as red or brown algae.

Still further, other cellulosic fibers for making substrates herein can include synthetic cellulose fiber types formed by spinning, including rayon in all its varieties, and other fibers derived from viscose or chemically-modified cellulose such as, for example, those available under the trade names LYOCELL and TENCEL.

Crosslinked cellulosic fibers, such as CMC 535, can also be used in forming substrates 12 described herein. Crosslinked cellulosic fibers can provide increased bulk and resiliency, as well as improved softness.

In some embodiments, the non-woody and synthetic cellulosic fibers can have fiber length greater than about 0.2 mm including, for example, having an average fiber size between about 0.5 mm and about 50 mm or between about 0.75 and about 30 mm or even between about 1 mm and about 25 mm. Generally speaking, when fibers of relatively larger average length are being used, it may often be advantageous to modify the amount and type of foaming surfactant. For example, in some embodiments, if fibers of relatively larger average length are being used, it may be beneficial to utilize relatively higher amounts of foaming surfactant in order to help achieve a foam with the required foam half life.

Additional fibers that may be utilized in the present disclosure include fibers that are resistant to the forming fluid, namely those that are non-absorbent and whose bending stiffness is substantially unimpacted by the presence of forming fluid. As noted above, typically the forming fluid will comprise water. By way of non-limiting example, water-resistant fibers include fibers such as polymeric fibers comprising polyolefin, polyester (PET), polyamide, polylactic acid, or other fiber forming polymers. Polyolefin fibers, such as polyethylene (PE) and polypropylene (PP), are particularly well suited for use in the present disclosure. In some embodiments, non-absorbent fibers can be recycled fibers, compostable fibers, and/or marine degradable fibers. In addition, highly cross-linked cellulosic fibers having no-significant absorbent properties can also be used herein. In this regard, due to its very low levels of absorbency to water, water resistant fibers do not experience a significant change in bending stiffness upon contacting an aqueous fluid and therefore are capable of maintaining an open composite structure upon wetting. The fiber diameter and composition of a fiber can contribute to enhanced bending stiffness. For example, a PET fiber has a higher bending stiffness than a polyolefin fiber whether in dry or wet states. The higher the fiber diameter, the higher the bending stiffness a fiber exhibits. Non-absorbent fibers desirably have a water retention value (WRV) less than about 1 and still more desirably between about 0 and about 0.5. In certain aspects, it is desirable that the fibers, or at least a portion thereof, include non-absorbent fibers.

The synthetic and/or water resistant fibers can have fiber length greater than about 0.2 mm including, for example, having an average fiber size between about 0.5 mm and about 50 mm or between about 0.75 and about 30 mm or even between about 1 mm and about 25 mm.

In some embodiments, the synthetic and/or water resistant fibers can have a crimped structure to enhance bulk generation capability of the foam formed fibrous substrate. For example, a PET crimped staple fiber may be able to generate a higher caliper (or result in a low sheet density) in comparison to a PET straight staple fiber with the same fiber diameter and fiber length.

In some embodiments, the total content of fibers, can comprise between about 0.01% to about 10% of the foam (by weight), and in some embodiments between about 0.1% to about 5% of the foam (by weight).

Binder

In some embodiments, a fluid supply 16, 28 can include binder materials that can be provided along with or independent of the supply of the fibers 20, 223 or the supply of the component 44. Binder materials that may be used in the present disclosure can include, but are not limited to, thermoplastic binder fibers, such as PET/PE bicomponent binder fiber, and water-compatible adhesives such as, for example, latexes. In some embodiments, binder materials as used herein can be in powder form, for example, such as thermoplastic PE powder. Importantly, the binder can comprise one that is water insoluble on the dried substrate. In certain embodiments, latexes used in the present disclosure can be cationic or anionic to facilitate application to and adherence to cellulosic fibers that can be used herein. For instance, latexes believed suitable for use include, but are not limited to, anionic styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, as well as other suitable anionic latex polymers known in the art. Examples of such latexes are described in U.S. Pat. No. 4,785,030 to Hager, U.S. Pat. No. 6,462,159 to Hamada, U.S. Pat. No. 6,752,905 to Chuang et al. and so forth. Examples of suitable thermoplastic binder fibers include, but are not limited to, monocomponent and multi-component fibers having at least one relatively low melting thermoplastic polymer such as polyethylene. In certain embodiments, polyethylene/polypropylene sheath/core staple fibers can be used. Binder fibers may have lengths in line with those described herein above in relation to the synthetic cellulosic fibers.

Binders in liquid form, such as latex emulsions, can comprise between about 0% and about 10% of the foam (by weight). In certain embodiments the non-fibrous binder can comprise between about 0.1% and 10% of the foam (by weight) or even between about 0.2% and about 5% or even between about 0.5% and about 2% of the foam (by weight). Binder fibers, when used, may be added proportionally to the other components to achieve the desired fiber ratios and structure while maintaining the total solids content of the foam below the amounts stated above. As an example, in some embodiments, binder fibers can comprise between about 0% and about 50% of the total fiber weight, and more preferably, between about 5% to about 40% of the total fiber weight in some embodiments.

Foam Stabilizers

In some embodiments, if a fluid supply 16, 28 is configured as a foam the foam may optionally also include one or more foam stabilizers known in the art and that are compatible with the components of the foam and further do not interfere with the hydrogen bonding as between the cellulosic fibers. Foam stabilizing agents believed suitable for use in the present disclosure, without limitation, one or more zwitterionic compounds, amine oxides, alkylated polyalkylene oxides, or mixture or combinations thereof. Specific examples of foam stabilizers includes, without limitation, cocoamine oxide, isononyldimethylamine oxide, n-dodecyldimethylamine oxide, and so forth.

In some embodiments, if utilized, the foam stabilizer can comprise between about 0.01% and about 2% of the foam (by weight). In certain embodiments, the foam stabilizer can comprise between about 0.05% and 1% of the foam or even between about 0.1 and about 0.5% of the foam (by weight).

Components and Coatings

In the methods as described herein, the foam forming process can include adding one or more components as additional additives that will be incorporated into the substrate 12. For example, one additional additive that can be added during the formation of the substrates 12 as described herein can be a superabsorbent materials (SAM). SAM is commonly provided in a particulate form and, in certain aspects, can comprise polymers of unsaturated carboxylic acids or derivatives thereof. These polymers are often rendered water insoluble, but water swellable, by crosslinking the polymer with a di- or polyfunctional internal crosslinking agent. These internally cross-linked polymers are at least partially neutralized and commonly contain pendant anionic carboxyl groups on the polymer backbone that enable the polymer to absorb aqueous fluids, such as body fluids. Typically, the SAM particles are subjected to a post-treatment to crosslink the pendant anionic carboxyl groups on the surface of the particle. SAMs are manufactured by known polymerization techniques, desirably by polymerization in aqueous solution as gel polymerization. The products of this polymerization process are aqueous polymer gels, i.e., SAM hydrogels that are reduced in size to small particles by mechanical forces, then dried using drying procedures and apparatus known in the art. The drying process is followed by pulverization of the resulting SAM particles to the desired particle size. Examples of superabsorbent materials include, but are not limited to, those described in U.S. Pat. No. 7,396,584 Azad et al., U.S. Pat. No. 7,935,860 Dodge et al., US2005/5245393 to Azad et al., US2014/09606 to Bergam et al., WO2008/027488 to Chang et al. and so forth.

In some embodiments incorporating SAM, the SAM can comprise between about 1% and about 40% of the foam (by weight). In certain embodiments, SAM can comprise between about 1% and about 30% of the foam (by weight) or even between about 5% and about 30% of the foam (by weight).

The component 44, such as SAM, can include a coating 45. The coating 45 can be volatile and hydrophobic. Such a coating 45 can provide the benefit of protecting the material temporarily during the formation of the foam and formation of the highly-expanded foam. For example, in one aspect, the SAM (or other component 44) may be treated with a water-soluble protective coating 45 having a rate of dissolution selected such that the SAM is not substantially exposed to the aqueous liquid carrier until the highly-expanded foam has been formed and drying operations initiated that can remove the volatile hydrophobic coating 45.

In a preferred embodiment, the volatile hydrophobic coating 45 can be a wax, such as paraffin wax. In some embodiments, the melting point of the material forming the coating 45 can be greater than 25° C. In some embodiments, the melting point of the coating 45 material can be between about 40° C. to about 70° C., and more preferably can be between about 40° C. to about 60° C., and even more preferably between about 40° C. to about 50° C. In some embodiments, the flash point of the coating 45 material can be less than 220° C. In some embodiments, the flash point of the coating 45 material can be between about 75° C. to about 150° C., more preferably between about 85° C. to about 135° C., and even more preferably between about 90° C. to about 125° C. An exemplary coating 45 that was utilized in testing described further herein was a paraffin wax purchased from Sigma Aldrich (CAS No. 8002-74-2) and has a melting point/range: 52.5-58.4° C. and a flash point of 113° C.

The coating 45 can be applied to the component 44 using known techniques. For example, the coating 45 can be applied in a spray process (e.g., hot melt spray process), dipping process, rotary coating process, fluidized bed coating process, vapor deposition process, or other suitable process as known by one of ordinary skill in the art. In hot melt spray processes, the coating 45 can be kept above its melting point during the entire coating period to promote formation of a uniform coating layer on the components 44 caused by particle-particle collision inside a fluidized bed. After reaching the desired amount of coating 45 on the component 44, the coating chamber or fluidized bed can be cooled to a temperature below the coating 45 material's melting point before the component 44 is taken from the chamber.

The coating 45 can be applied in various weight percentages to the component 44. In some embodiments, the coating 45 can comprise from less than 40% of the component 44 (by weight). In some embodiments, the coating 45 can comprise between about 1% to about 35%, or from about 5% to about 25% of the component 44 (by weight).

Other additional agents can include one or more wet strength additives that can be added to the foam or fluid supply 16, 28 in order to help improve the relative strength of the ultra-low density composite cellulosic material. Such strength additives suitable for use with paper making fibers and the manufacture of paper tissue are known in the art. Temporary wet strength additives may be cationic, nonionic or anionic. Examples of such temporary wet strength additives include PAREZ™ 631 NC and PAREZ® 725 temporary wet strength resins that are cationic glyoxylated polyacrylamides available from Cytec Industries, located at West Paterson, N.J. These and similar resins are described in U.S. Pat. No. 3,556,932 to Coscia et al. and U.S. Pat. No. 3,556,933 to Williams et al. Additional examples of temporary wet strength additives include dialdehyde starches and other aldehyde containing polymers such as those described in U.S. Pat. No. 6,224,714 to Schroeder et al.; U.S. Pat. No. 6,274,667 to Shannon et al.; U.S. Pat. No. 6,287,418 to Schroeder et al.; and U.S. Pat. No. 6,365,667 to Shannon et al., and so forth.

Permanent wet strength agents comprising cationic oligomeric or polymeric resins may also be used in the present disclosure. Polyamide-polyamine-epichlorohydrin type resins such as KYMENE 557H sold by Solenis are the most widely used permanent wet-strength agents and are suitable for use in the present disclosure. Such materials have been described in the following U.S. Pat. No. 3,700,623 to Keim; U.S. Pat. No. 3,772,076 to Keim; U.S. Pat. No. 3,855,158 to Petrovich et al.; U.S. Pat. No. 3,899,388 to Petrovich et al.; U.S. Pat. No. 4,129,528 to Petrovich et al.; U.S. Pat. No. 4,147,586 to Petrovich et al.; U.S. Pat. No. 4,222,921 to van Eenam and so forth. Other cationic resins include polyethylenimine resins and aminoplast resins obtained by reaction of formaldehyde with melamine or urea. Permanent and temporary wet strength resins may be used together in the manufacture of composite cellulosic products of the present disclosure. Further, dry strength resins may also optionally be applied to the composite cellulosic webs of the present disclosure. Such materials may include, but are not limited to, modified starches and other polysaccharides such as cationic, amphoteric, and anionic starches and guar and locust bean gums, modified polyacrylamides, carboxymethylcellulose, sugars, polyvinyl alcohol, chitosan, and the like.

When a wet or dry strength additive is used, it is preferable to select such an additive to be compatible with the foam agent used for the foam process. For example, when a strength additive is a cationic resin, due to incompatibility between a cationic and an anionic substance, a cationic surfactant is preferably used as a foam agent, or vice versa. A non-ionic surfactant is usually compatible with any cationic and anionic strength additives.

If used, such wet and dry strength additives can comprise between about 0.01 and about 5% of the dry weight of cellulose fibers. In certain embodiments, the strength additives can comprise between about 0.05% and about 2% of the dry weight of cellulose fibers or even between about 0.1% and about 1% of the dry weight of cellulose fibers.

Still other additional components may be added to the foam so long as they do not significantly interfere with the formation of the foam, the hydrogen bonding as between the cellulosic fibers or other desired properties of the web. As examples, additional additives may include one or more pigments, opacifying agents, anti-microbial agents, pH modifiers, skin benefit agents, odor absorbing agents, fragrances, thermally expandable microspheres, foam particles (such as, pulverized foam particles), and so forth as desired to impart or improve one or more physical or aesthetic attributes.

In certain embodiments the substrates 12 may include skin benefit agents such as, for example, antioxidants, astringents, conditioners, emollients, deodorants, external analgesics, film formers, humectants, hydrotropes, pH modifiers, surface modifiers, skin protectants, and so forth. Some of these components may benefit from having a coating 45 as described above.

When employed, miscellaneous components desirably comprise less than about 2% of the foam (by weight) and still more desirably less than about 1% of the foam (by weight) and even less than about 0.5% of the foam (by weight).

In some embodiments, the solids content, including the fibers or particulates contained herein, desirably comprise no more than about 40% of the foam (by weight). In certain embodiments the cellulosic fibers can comprise between about 0.1% and about 5% of the foam (by weight) or between about 0.2 and about 4% of the foam (by weight) or even between about 0.5% and about 2% of the foam (by weight).

The methods and apparatuses 10, 110 as described herein can be beneficial for forming one or more components of personal care products. For example, in one embodiment, the substrates 12 described herein can be an absorbent core for an absorbent article, such as, but not limited to, a diaper, adult incontinence garment, or feminine care product. The substrates 12 as described herein may also be beneficial for using in other products, such as, but not limited to facial tissues, wipes, and wipers.

Experiments

Experiments were conducted to provide a coating 45 on the component 44 of two different commercially available SAM to determine whether the coating 45 can be adequately removed and whether the SAM would still function as desired for its liquid absorption characteristics after the coating 45 was removed. The two commercially available SAMs that were tested were SXM 5660 from Evonik and SG 200 from San-Dia Polymers, Limited.

The exemplary volatile hydrophobic coating 45 that was tested was paraffin wax (CAS No. 8002-74-2), purchased from Sigma-Aldrich, which has a melting point/range: 52.5-58.4° C. and a flash point of 113° C. The coating 45 was applied to the two different SAMs using a hot melt spray application in a fluidized bed to the desired amount of add-on (5%-30%) as shown in Table 1.

In order to monitor the coating 45 effectiveness on the SAM, the vortex time of the coated samples as well as two control SAMs was tested. The vortex time measures the time needed for a SAM to absorb the given amount of testing fluid at a fixed ratio of the SAM to fluid, and is described in the Test Methods section herein. The greater the vortex time, the slower the coated SAM swells. As used herein, the Rate Slowing Factor is a ratio of a sample's vortex time to its control SAM's vortex time. The results of both vortex time and Rate Slowing Factor are listed in Table 1.

TABLE 1

| Vortex Times of the Coated SAMs | | | | |
|---|---|---|---|---|
| Code | SAM Type | Paraffin (wt. %) | Vortex Time (sec) | Rate Slowing Factor |
| A001-0 | SG 200 | 0 | 42 | 1.00 |
| A001-1 | SG 200 | 5 | 61 | 1.45 |
| A001-2 | SG 200 | 10 | 95 | 2.26 |
| A001-3 | SG 200 | 20 | 107 | 2.55 |
| A001-4 | SG 200 | 30 | 192 | 4.57 |
| A002-0 | SXM 5660 | 0 | 55 | 1.00 |
| A002-1 | SXM 5660 | 5 | 62 | 1.13 |
| A002-2 | SXM 5660 | 10 | 80 | 1.45 |
| A002-3 | SXM 5660 | 20 | 136 | 2.47 |
| A002-4 | SXM 5660 | 30 | 210 | 3.82 |

As documented in Table 1, the coating 45 protects the SAM from absorbing liquid, as evidenced by the Rate Slowing Factor being greater than 1 for each experimental code that included a coating 45. The Rate Slowing Factor was shown to increase as a greater amount of coating 45 was applied to the SAM. A Rate Slowing Factor of 4.57 was achieved for a 30% coating (by weight) being applied to the SG 200 SAM and a Rate Slowing Factor of 3.82 was achieved for a 30% coating (by weight) being applied to the SXM 5660 SAM.

After this first round coating level study, the code including SXM 5660 coated at 20% paraffin coating level (by weight) (Code A002-3) was selected for further study for heat treatment. The heat treatment testing was conducted to determine how effectively the coating 45 could be removed from the SAM. For this testing, about 25 grams of the selected code of coated SAM was placed in a metal pan and spread to a thin layer as uniformly as possible. The pan together with the coated SAM was placed into an oven at different temperatures for different amounts of heating or curing time, as documented in Table 2. Three weights (pan only, dry SAM weight, and pan+SAM weight after heat curing) were recorded. From these three weights, how much paraffin was heated off or evaporated by the curing could be calculated and then the remaining paraffin on the SAM could also be calculated by deducting from its initial coating amount, that is 20% paraffin (by weight). The oven used in the lab was equipped with a ventilator. The first six samples were prepared with a closed ventilator, while the last two samples were prepared with an open ventilator.

TABLE 2

Coating Removal by Heating at Different Temperatures & Times

| Sample No. | Pan Weight (g) | Dry Coated SAM (g) | Pan + SAM Weight after Heating (g) | Heating Conditions | | | Paraffin on SAM (%) | |
|---|---|---|---|---|---|---|---|---|
| | | | | Temp (° C.) | Time (min) | Ventilator On/Off | Heating Off (wt. %) | Remaining On (wt. %) |
| A002-3 | | | | NA | NA | NA | 0% | 20% |
| 1 | 446.8 | 25.02 | 469.6 | 150 | 10 | Off | −8.87% | 11.13% |
| 2 | 447.4 | 25.07 | 470.7 | 150 | 20 | Off | −7.06% | 12.94% |
| 3 | 588.3 | 25.21 | 610.9 | 175 | 5 | Off | −10.35% | 9.65% |
| 4 | 596.6 | 25.19 | 619.4 | 175 | 10 | Off | −9.49% | 10.51% |
| 5 | 446.7 | 25.05 | 468.9 | 200 | 5 | Off | −11.38% | 8.62% |
| 6 | 447.2 | 25.04 | 468.8 | 200 | 10 | Off | −13.74% | 6.26% |
| 7 | 450.2 | 25.01 | 471.8 | 175 | 10 | On | −13.63% | 6.37% |
| 8 | 451.8 | 25.04 | 472.3 | 175 | 20 | On | −18.13% | 1.87% |

In all the cases, a higher temperature or a longer heating time with or without an open ventilator would always drive off more paraffin coating from the SAM. The results also support that an open ventilator helped removal of the coated paraffin to a high effectiveness at a relatively lower temperature.

Further testing was conducted to determine whether the SAM with the coating 45 removed would still function effectively. Vortex time testing, Centrifuge Retention Capacity ("CRC") testing, and Absorbency Under Load ("AUL") testing was conducted on the SAM codes that was heat treated to remove the coating 45 (CRC and AUL tests also being described in the test methods section herein). The results are shown in Table 3.

TABLE 3

Absorbent Properties of the Heated Coated SAMs

| Sample No. | Treatment History | Paraffin (%) | Heating Conditions | | | Absorbent Properties | | |
|---|---|---|---|---|---|---|---|---|
| | | | Temp (° C.) | Time (min) | Ventilator On/Off | Vortex Time (sec) | CRC (g/g) | 0.9 psi AUL (g/g) |
| A002-0 | Control | 0% | NA | NA | NA | 55.0 | 28.0 | 15.6 |
| A002-3 | Coated | 20% | NA | NA | NA | 136.0 | 26.2 | 14.6 |
| 1 | Coated/Heated | 11.13% | 150 | 10 | Off | 93.5 | 27.1 | 16.6 |
| 2 | Coated/Heated | 12.94% | 150 | 20 | Off | 96.6 | 26.6 | 16.1 |
| 3 | Coated/Heated | 9.65% | 175 | 5 | Off | 89.5 | 26.2 | 16.6 |
| 4 | Coated/Heated | 10.51% | 175 | 10 | Off | 92.3 | 25.1 | 17.3 |
| 5 | Coated/Heated | 8.62% | 200 | 5 | Off | 85.6 | 26.8 | 16.7 |
| 6 | Coated/Heated | 6.26% | 200 | 10 | Off | 70.5 | 23.9 | 17.4 |
| 7 | Coated/Heated | 6.37% | 175 | 10 | On | 72.1 | 26.1 | 16.6 |
| 8 | Coated/Heated | 1.87% | 175 | 20 | On | 61.5 | 25.8 | 16.8 |

As heat curing gradually removes the coated paraffin from the SAM, the vortex time of the heated SAMs is gradually changed towards the control SAM. For example, Sample 8 which has most of the paraffin removed and only contains 1.87% paraffin on its surface exhibits a vortex time of 61.5 sec in comparison to its control uncoated SAM (55 seconds). Therefore, it can be concluded that the vortex time of a heated SAM after the paraffin coating is completely removed will be the same as the control SAM.

All the CRC values of either coated or heated SAMs are slightly lower than the control SAM. However, the differences are rather small and show that the SAM can still function effectively after the coating 45 is removed from the SAM. It is believed that the only difference between a SAM with the coating 45 removed compared to the control SAM is due to accuracy of the paraffin amount on the coated SAMs either before or after heating. Since paraffin is non-absorbent material, its weight needs to be deducted from the weight of total coated or heated SAMs which were used in the absorbent property testing. A 20% coating might not exactly be 20% by weight, which contributes to the final calculated CRC values that were obtained (either slightly lower or higher). Another surprising finding is that the CRC values of the coated or heated SAM with a wide range of vortex times are almost identical. That indicates the CRC values are independent from their absorption rate. The coating 45 only affects the rate, but not the total absorbency of the coated SAMs. This is believed to occur because the coating 45 is only effective in a short time scale (less than a few minutes). After exposure to fluid for a few minutes, the paraffin coated layer would be completely broken by the SAM swell. As described in the test methods section herein, the CRC testing lasts 30 minutes. This finding is positive from the standpoint that it is not imperative to remove absolutely all of the coating 45 from the SAM in order to still have the SAM exhibit a sufficient absorption rate in a product form.

As documented in Table 3, all the heated SAMs exhibit slightly higher AUL values, and this is expected to be occur due to the same reason explained above with respect to the CRC values. Additionally, since the AUL testing lasts one hour, how much coating 45 remaining on the SAM is not believed to affect the AUL value much, which again, provides a positive indication that it is not necessary to completely remove the coating 45 from the SAM as long as the SAM absorption rate reaches to an acceptable level.

Overall, the absorbent properties of the heated SAMs to remove the coating 45 indicate that coated SAM can effectively protect and reduce the absorption of liquid by SAM during processing or handling of the SAM in a process including a liquid, the coating 45 can be effectively removed with heat, and in doing so, can provide the SAM with substantially all of its original performance characteristics. No negative impacts were observed from either the paraffin coating or the heating process which drives off the paraffin coating. Exposure to increased temperatures may cause a slight degree of further crosslinking in SAM, which may slightly reduce the heated SAM's CRC and enhance its AUL, which may have also been observed in these experimental results, but this effect is not believed to occur to a level of significant concern.

Test Methods

Vortex Time Test

The Vortex Time is the amount of time in seconds required for a predetermined mass of superabsorbent particles to close a vortex created by stirring 50 milliliters of 0.9 percent by weight sodium chloride solution at 600 revolutions per minute on a magnetic stir plate. The time it takes for the vortex to close is an indication of the free swell absorbing rate of the particles. The vortex time test may be performed at a temperature of 23° C. and relative humidity of 50% according to the following procedure:

(1) Measure 50 milliliters (±0.01 milliliter) of 0.9 percent by weight sodium chloride solution into the 100-milliliter beaker.

(2) Place a 7.9 millimeters×32 millimeters TEFLON® covered magnetic stir bar without rings (such as that commercially available under the trade designation SIP® brand single pack round stirring bars with removable pivot ring) into the beaker.

(3) Program a magnetic stir plate (such as that commercially available under the trade designation DATA-PLATE® Model #721) to 600 revolutions per minute.

(4) Place the beaker on the center of the magnetic stir plate such that the magnetic stir bar is activated. The bottom of the vortex should be near the top of the stir bar. The superabsorbent particles are pre-screened through a U.S. standard #30 mesh screen (0.595 millimeter openings) and retained on a U.S. standard #50 mesh screen (0.297 millimeter openings).

(5) Weigh out the required mass of the superabsorbent particles to be tested on weighing paper.

(6) While the sodium chloride solution is being stirred, quickly pour the absorbent polymer to be tested into the saline solution and start a stopwatch. The superabsorbent particles to be tested should be added to the saline solution between the center of the vortex and the side of the beaker.

(7) Stop the stopwatch when the surface of the saline solution becomes flat and record the time. The time, recorded in seconds, is reported as the vortex time.

Centrifuge Retention Capacity Test

The Centrifuge Retention Capacity (CRC) Test measures the ability of the absorbent sample to retain liquid therein after being saturated and subjected to centrifugation under controlled conditions. The resultant retention capacity is stated as grams of liquid retained per gram weight of the sample (g/g).

The retention capacity is measured by placing 0.2±0.005 grams of the sample into a water-permeable bag which will contain the sample while allowing a test solution (0.9 weight percent sodium chloride in distilled water) to be freely absorbed by the sample. A heat-sealable tea bag material, such as that available from Dexter Corporation of Windsor Locks, Conn., U.S.A., as model designation 1234T heat sealable filter paper, works well for most applications. The bag is formed by folding a 5-inch by 3-inch (12.7-cm by 7.6-cm) sample of the bag material in half and heat-sealing two of the open edges to form a 2.5-inch by 3-inch (6.4-cm by 7.6-cm) rectangular pouch. The heat seals should be about 0.25 inches (0.64 cm) inside the edge of the material. After the sample is placed in the pouch, the remaining open edge of the pouch is also heat-sealed. Empty bags are also made to serve as controls. Three samples (i.e., filled and sealed bags) are prepared for the test. The filled bags must be tested within three minutes of preparation unless immediately placed in a sealed container, in which case the filled bags must be tested within thirty minutes of preparation.

The bags are placed between two TEFLON coated fiber-glass screens having 3 inch (7.6 cm) openings (available from Taconic Plastics, Inc., having a place of business in Petersburg, N.Y., U.S.A.) and submerged in a pan of the test solution at 23 degrees Celsius, making sure that the screens are held down until the bags are completely wetted. After wetting, the samples remain in the solution for about 30±1 minutes, at which time they are removed from the solution and centrifuged as described in the paragraph below. For multiple tests, the pan should be emptied and refilled with fresh test solution after 24 bags have been saturated in the pan.

The wet bags taken from the testing solution are then placed into the basket of a suitable centrifuge capable of subjecting the samples to a g-force of about 350. One suitable centrifuge is a Heraeus LaboFuge 400 having a water collection basket, a digital rpm gauge, and a machined drainage basket adapted to hold and drain the bag samples. Where multiple samples are centrifuged, the samples must be placed in opposing positions within the centrifuge to balance the basket when spinning. The bags (including the wet, empty bags) are centrifuged at about 1,600 rpm (e.g., to achieve a target g-force of about 350), for 3 minutes. The bags are removed and weighed, with the empty bags (controls) being weighed first, followed by the bags containing the samples. The amount of solution retained by the sample, taking into account the solution retained by the bag itself, is the centrifuge retention capacity (CRC) of the sample, expressed as grams of fluid per gram of sample. More particularly, the retention capacity is determined as:

CRC=(sample/bag wt after centrifuge−empty bag wt after centrifuge−dry sample wt)/dry sample wt where "wt" in the above equation stands for weight.

Three samples are tested and the results are averaged to determine the centrifuge retention capacity (CRC). The samples are tested at 23±1° C. and at 50±2% relative humidity.

Absorbency Under Load Test

Figure 7:
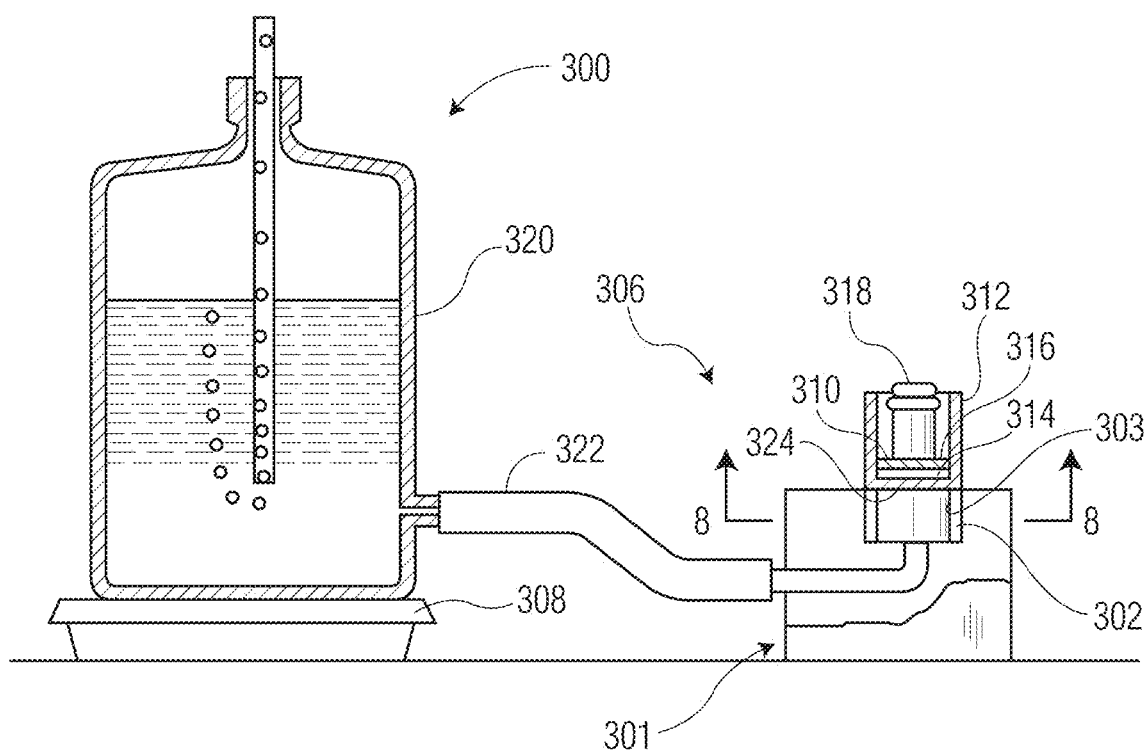
FIG. 7 is a cross-section of an apparatus for conducting an Absorbency Under Load Test.

The Absorbency Under Load (AUL) Test measures the ability of the superabsorbent material to absorb a 0.9 weight percent solution of sodium chloride in distilled water at room temperature (test solution) while the material is under a 0.9 psi load. Apparatus 306 for conducting the AUL Test is shown in FIG. 7 and comprises a Demand Absorbency Tester (DAT), generally indicated at 300, which is similar to the Gravimetric Absorbency Test System (GATS) available from M/K Systems of Danners, Mass., U.S.A., and to the system described by Lichstein at pages 129-142 of the INDA Technological Symposium Proceedings, March 1974.

Figure 8:
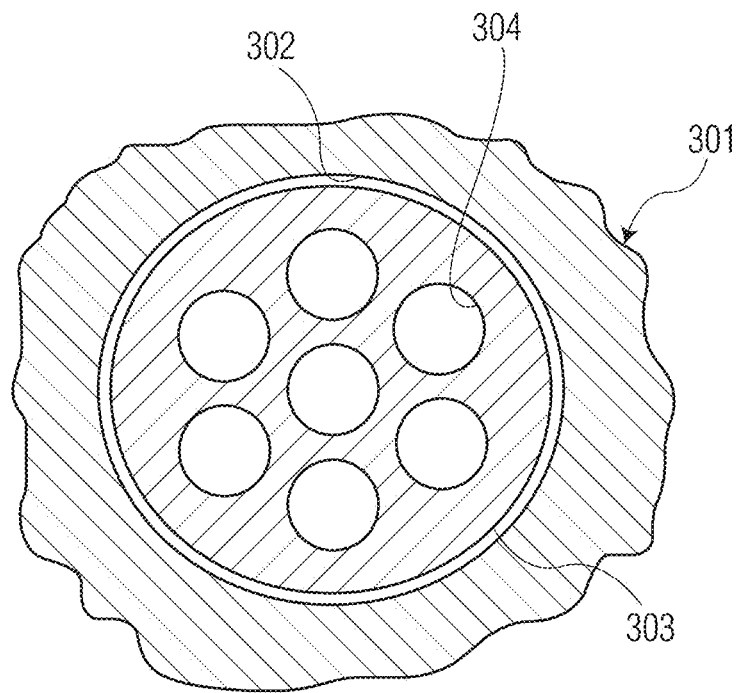
FIG. 8 is a section taken in the plane of line 8-8 in FIG. 7.

The test apparatus further comprises a test stand, generally indicated at 301 (FIG. 8) having a cavity 302 formed therein and a porous plate 303 seated in the cavity and having a central porous area of about 2.54 cm diameter formed by a plurality of bores 304 extending through the plate. The cavity 302 shown in FIG. 8 has a diameter of about 3.2 cm and the porous plate 303 has a diameter of about 3.1 cm and comprises seven bores 304, each having a diameter of about 0.3 cm. One of the bores 304 is centrally located and the remaining six bores are concentrically positioned about the central bore with the spacing from the center of the central bore to the center of each adjacent bore is about one centimeter.

A sample container for containing a sample 310 of superabsorbent material to be tested comprises a cylinder 312 and a stainless steel cloth screen 314 that is biaxially stretched to tautness and attached to the lower end of the cylinder. The cylinder 312 may be bored from a transparent LEXAN rod or equivalent material, or it may be cut from a LEXAN tubing or equivalent material, and has an inner diameter of about one inch (about 2.54 cm). The stainless steel cloth screen 314 is suitably a 100 mesh screen.

A disc, or piston 316 is machined from a LEXAN rod, Plexiglas or equivalent material and has a diameter sized such that it fits within the cylinder 312 with minimum wall clearance but still slides freely. The height of the piston 316 is approximately 0.8 cm and the weight of the piston is suitably about 4.4 grams to provide a load over the cross-sectional area of the sample in the container of about 0.01 psi. A weight 318 is sized (e.g., having a diameter of about 2.5 cm) for seating on the piston 316 to increase the load (e.g., in addition to the weight of the piston) on the sample. For example, a weight of about 317 grams is used to provide a load (e.g., including the piston weight) of about 0.9 psi over the cross-sectional area of the sample in the container.

The cavity 302, and hence the porous plate 303, is in fluid communication with a reservoir 320 containing test solution (0.9 weight percent sodium chloride solution in distilled water at room temperature) via a suitable conduit 322. As shown in FIG. 7, the reservoir 320 is seated on an electrostatic balance 308.

A sample 310 of superabsorbent material weighing about 0.160 grams is prepared by screening the particles through a U.S. standard 30 mesh screen and retaining the particles on a U.S. standard 50 mesh screen so that the sample comprises particles in the size range of about 300 to about 600 microns. The sample is weighed on suitable weighing paper and then loaded into the sample container (with the piston 316 removed) so that the particles overlay the screen at the bottom of the container. The sample container is gently tapped to level the bed of particles in the container.

The AUL Test is initiated by placing a circular piece of GF/A glass filter paper 124 onto the porous plate 303 over the bores 304 formed therein and allowed to become saturated by test solution delivered from the reservoir 320 to the porous plate via the conduit 322. The paper 324 is suitably sized larger than the inner diameter of the cylinder 312 and smaller than the outer diameter thereof to ensure good contact while inhibiting evaporation over the bores 304. The electrostatic balance 308 is zeroed at this time. The piston 316 and weight 318 are placed on the sample within the container and the container (with the sample, piston and weight therein) is placed on the plate 303 over the saturated glass filter paper 324 to allow test solution to be taken into the sample in the container via the conduit 322, bores 304 in the plate 302 and the filter paper.

The electrostatic balance 308 is used to measure the flow of test solution to the sample over a period of about 60 minutes. The amount (in grams) of solution taken into the sample after about 60 minutes divided by the dry weight of the sample (e.g., about 0.160 grams) is the AUL value of the sample in grams of liquid per gram weight of sample.

Two checks can be made to ensure the accuracy of the measurement. First, the height the piston 316 rises above the screen 314 at the bottom of the sample container multiplied by the cross-sectional area of the piston should roughly equal the amount of solution picked up by the sample over the 60 minute period. Second, the sample container can be weighed before (e.g., while the superabsorbent material is dry) and after the test and the difference in weight should roughly equal the amount of solution picked up by the sample over the 60 minute period.

A minimum of three tests is performed and the results are averaged to determine the AUL value at 0.9 psi. The samples are tested at 23±1 degrees Celsius at 50±2 percent relative humidity.

Embodiments

Embodiment 1: A method of manufacturing a substrate including a component, the method comprising: providing a fluid supply including a liquid; providing a supply of the component, the component comprising a volatile hydrophobic coating; introducing the component to the fluid supply; transferring the component in the fluid supply to provide the substrate; and applying heat to the substrate; the heat removing the volatile hydrophobic coating from the component.

Embodiment 2: The method of embodiment 1, wherein the component is a superabsorbent material.

Embodiment 3: The method of embodiment 2, wherein the superabsorbent material is a particulate.

Embodiment 4: The method of any one of the preceding embodiments, wherein the fluid supply comprises a foam.

Embodiment 5: The method of embodiment 4, wherein the foam comprises the liquid, a gas, and a surfactant.

Embodiment 6: The method of embodiment 4 or 5, wherein the fluid supply further comprises fibers.

Embodiment 7: The method of any one of the preceding embodiments, further comprising: dewatering the substrate before applying heat to the substrate.

Embodiment 8: The method of any one of the preceding embodiments, wherein the volatile hydrophobic coating comprises a melting point greater than 25° C.

Embodiment 9: The method of any one of the preceding embodiments, wherein the volatile hydrophobic coating comprises a flash point less than 220° C.

Embodiment 10: The method of any one of the preceding embodiments, wherein the volatile hydrophobic coating comprises a wax.

Embodiment 11: A method of handling a superabsorbent material, the method comprising: providing a fluid supply including a liquid; providing a supply of the superabsorbent material, the superabsorbent material comprising a volatile hydrophobic coating; introducing the superabsorbent material to the fluid supply; and applying heat to the superabsorbent material; the heat removing substantially all of the volatile hydrophobic coating from the superabsorbent material.

Embodiment 12: The method of embodiment 11, wherein the fluid supply comprises a foam including the liquid, a gas, a surfactant, and wherein fibers are dispersed in the foam.

Embodiment 13: The method of embodiment 11 or 12, wherein the volatile hydrophobic coating comprises a melting point greater than 25° C. and a flash point less than 220° C.

Embodiment 14: An absorbent material comprising: a superabsorbent material; and a volatile hydrophobic coating on the superabsorbent material, the volatile hydrophobic coating comprising a melting point greater than 25° C. and a flash point less than 220° C.

Embodiment 15: The absorbent material of embodiment 14, wherein the volatile hydrophobic coating provides at least 10% by weight of the absorbent material.

Embodiment 16: The absorbent material of embodiment 14 or 15, wherein the volatile hydrophobic coating comprises a wax.

Embodiment 17: The absorbent material of any one of embodiments 14-16, wherein the melting point is between 40° C. and 70° C.

Embodiment 18: The absorbent material of any one of embodiments 14-17, wherein the flash point is between 75° C. and 150° C.

Embodiment 19: The absorbent material of any one of embodiments 14-18, wherein the volatile hydrophobic coating provides a Rate Slowing Factor of at least 1.45.

Embodiment 20: The absorbent material of any one of embodiments 14-19, wherein the superabsorbent material is a particulate.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by references, the meaning or definition assigned to the term in this written document shall govern.

While particular embodiments have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a substrate including a component, the method comprising:
   providing a fluid supply including a liquid;
   providing a supply of the component, the component comprising a volatile hydrophobic coating, wherein the volatile hydrophobic coating comprises from 1% to 35% by weight of the component;
   introducing the component to the fluid supply by mixing the component into the fluid supply, the volatile hydrophobic coating including a rate of dissolution such that the volatile hydrophobic coating temporarily protects the component from the liquid of the first fluid supply;
   transferring the component in the fluid supply to provide the substrate; and
   applying heat to the substrate; the heat removing the volatile hydrophobic coating from the component.

2. The method of claim 1, wherein the component is a superabsorbent material.

3. The method of claim 2, wherein the superabsorbent material is a particulate.

4. The method of claim 1, wherein the fluid supply comprises a foam.

5. The method of claim 4, wherein the foam comprises the liquid, a gas, and a surfactant.

6. The method of claim 4, wherein the fluid supply further comprises fibers.

7. The method of claim 1, further comprising:
   dewatering the substrate before applying heat to the substrate.

8. The method of claim 1, wherein the volatile hydrophobic coating comprises a melting point greater than 25° C.

9. The method of claim 1, wherein the volatile hydrophobic coating comprises a flash point less than 220° C.

10. The method of claim 1, wherein the volatile hydrophobic coating comprises a wax.

11. The method of claim 1, wherein the component is a particulate.

12. The method of claim 1, wherein the component is a fiber.

13. A method of handling a superabsorbent material, the method comprising:
- providing a fluid supply including a liquid, wherein the fluid supply comprises a foam including the liquid, a gas, a surfactant, and wherein fibers are dispersed in the foam;
- providing a supply of the superabsorbent material, the superabsorbent material comprising a volatile hydrophobic coating, wherein the volatile hydrophobic coating comprises from 1% to 35% by weight of the superabsorbent material;
- introducing the superabsorbent material to the fluid supply, the volatile hydrophobic coating including a rate of dissolution such that the volatile hydrophobic coating temporarily protects the superabsorbent material from the liquid of the first fluid supply; and
- applying heat to the superabsorbent material; the heat removing the volatile hydrophobic coating from the superabsorbent material.

14. The method of claim 13, wherein the volatile hydrophobic coating comprises a melting point greater than 25° C. and a flash point less than 220° C.

\* \* \* \* \*